US012754931B1

(12) United States Patent
Burnett et al.

(10) Patent No.: US 12,754,931 B1
(45) Date of Patent: Oct. 6, 2026

(54) MIRRORED LOOKUP TABLE AT STREAM DATA PROCESSING AND BATCH SEARCH SYSTEMS

(71) Applicant: Cisco Technology, Inc., San Jose, CA (US)

(72) Inventors: Ricky Burnett, Davis, CA (US); Ryan Min, Toronto (CA); Zhen Peng Zhu, Bellevue, WA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 18/584,824

(22) Filed: Feb. 22, 2024

(51) Int. Cl.
*G06F 16/27* (2019.01)
*G06F 16/22* (2019.01)

(52) U.S. Cl.
CPC ........ *G06F 16/275* (2019.01); *G06F 16/2282* (2019.01)

(58) Field of Classification Search
CPC ........................... G06F 16/275; G06F 16/2282
USPC .......................................................... 707/610
See application file for complete search history.

(56) References Cited

U.S. PATENT DOCUMENTS 7,937,344 B2 5/2011 Baum et al.
8,112,425 B2 2/2012 Baum et al.
8,751,529 B2 6/2014 Zhang et al.
8,788,525 B2 7/2014 Neels et al.
9,215,240 B2 12/2015 Merza et al.
9,286,413 B1 3/2016 Coates et al.
10,127,258 B2 11/2018 Lamas et al.
11,803,568 B1 * 10/2023 Jain ..................... G06F 11/3409
11,899,644 B2 * 2/2024 Liu ....................... G06F 16/248
11,983,181 B1 * 5/2024 Bambharoliya ...... G06F 16/248
2010/0303349 A1 * 12/2010 Bechtel ................ H04N 25/134 382/165
2014/0075041 A1 * 3/2014 Keesara .................. H04L 49/20 709/231
2014/0343753 A1 * 11/2014 Kirsch ................ G07C 5/0816 701/2

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Angelica Ruiz
(74) *Attorney, Agent, or Firm* — Shook, Hardy & Bacon L.L.P.

(57) ABSTRACT

Systems and methods are described for generating, using, and modifying a mirrored lookup table by a stream data processing system. On receipt of a request relating to a pipeline for streaming data processing, a stream data processing system may access a lookup table of a batch search system including a set of key-value pairs. Based on the lookup table, the stream data processing system may generate a mirrored lookup table at the stream data processing system by at least replicating the set of key-value pairs. The stream data processing system may use the mirror table in performing lookup operations to enrich the streaming data input. The output of the lookup operations or the output of the pipeline may be provided to a destination, such as the batch search system.

20 Claims, 11 Drawing Sheets

(56) References Cited

U.S. PATENT DOCUMENTS

| | | | | |
|---|---|---|---|---|
| 2015/0195343 | A1 * | 7/2015 | Barabash ............ | H04L 41/0894<br>709/204 |
| 2018/0137186 | A1 * | 5/2018 | Brodt .................... | G06F 16/275 |
| 2018/0349425 | A1 * | 12/2018 | Hazel ...................... | G06F 16/83 |
| 2019/0098106 | A1 | 3/2019 | Mungel et al. | |
| 2020/0210398 | A1 * | 7/2020 | Liu ...................... | G06F 16/283 |
| 2021/0157858 | A1 * | 5/2021 | Stevens ................. | G06F 40/237 |
| 2021/0194779 | A1 * | 6/2021 | Punj ...................... | H04L 43/026 |
| 2022/0121708 | A1 * | 4/2022 | Burnett ............... | G06F 16/9038 |
| 2022/0292827 | A1 * | 9/2022 | Chen ..................... | G06F 16/786 |

OTHER PUBLICATIONS

Carraso, David, "Exploring Splunk," published by Cito Research, New York, NY, Apr. 2012.

SLAML 10 Reports, Workshop on Managing Systems via Log Analysis and Machine Learning Techniques. ;login: Feb. 2011—Conference Reports—vol. 36, No. 1, pp. 104-110.

Splunk.com, "About fields," in 8 pages, Retrieved from Splunk Documentation <URL: https://docs.splunk.com/Documentation/SplunkCloud/9.1.2308/Knowledge/Aboutfields> on Feb. 9, 2024.

Splunk.cm, "Enabling filed lookups," in 11 pages, Retrieved from Splunk Documentation <URL: https://docs.splunk.com/Documentation/SplunkCloud/latest/SearchTutorial/Usefieldlookups> on Feb. 9, 2024.

Splunk.com, "SPL2 Search Reference," in 4 pages, Retrieved from Splunk Documentation <URL: https://docs.splunk.com/Documentation/SCS/current/SearchReference/LookupCommandExamples> on Jan. 24, 2024.

Splunk.com, "Splexicon," in 12 pages, Retrieve from Splunk Documentation <URL: https://docs.splunk.com/Splexicon:Lookup> on Feb. 9, 2024.

Splunk Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020.

Splunk Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020.

Splunk Quick Reference Guide, updated 2019, available online at https://www.splunk.com/pdfs/solution-guides/splunk-quick-reference-guide.pdf, retrieved May 20, 2020.

* cited by examiner

200

| time | host | action | department | userid |
|---|---|---|---|---|
| 1:02:45 PM 13 Apr 2022 | mailsv2 | Failed password | Engineering | 1066 |
| 10:52:41 AM 13 Apr 2022 | mailsv1 | Failed password | IT | 1815 |
| 6:23:48 AM 13 Apr 2022 | mailsv3 | Session Closed | | 1916 |
| 6:23:48 AM 13 Apr 2022 | mailsv3 | Failed password | | |
| 8:18:36 PM 12 Apr 2022 | mailsv1 | Session Closed | Engineering | 1690 |

204

202

| userid | username | Department |
|---|---|---|
| 1066 | Claudia Garcia | Engineering |
| 1690 | Rutherford Sullivan | Engineering |
| 1815 | Vanya Patel | IT |
| 1862 | Wei Zhang | Engineering |
| 1916 | Alex Martin | Personnel |

*FIG. 2*

MIRRORED LOOKUP TABLE AT STREAM DATA PROCESSING AND BATCH SEARCH SYSTEMS

BRIEF DESCRIPTION OF THE DRAWINGS

FIG. 2 illustrates example datasets which may be used in lookup operations.

DETAILED DESCRIPTION

Figure 1:
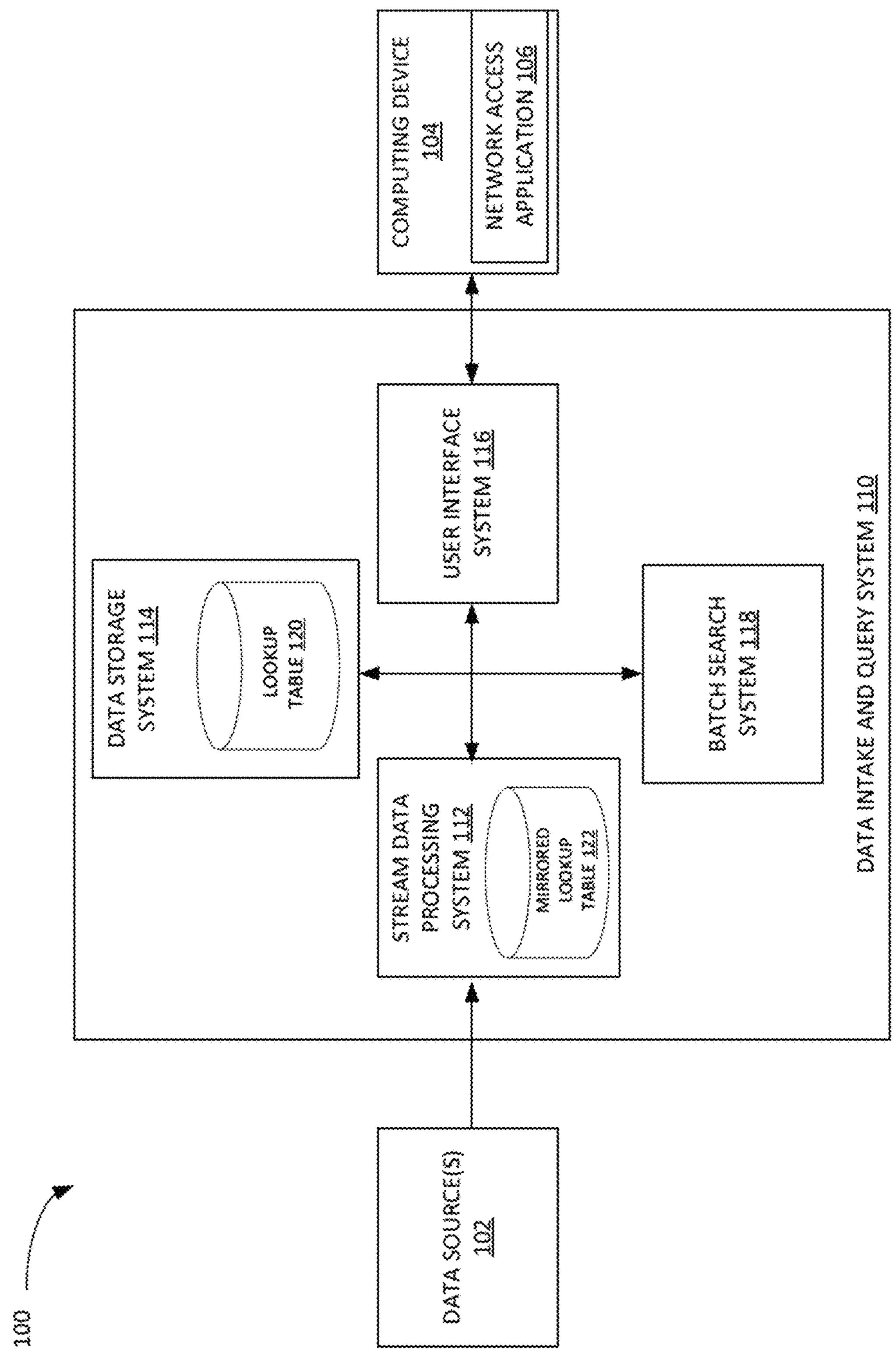
FIG. 1 depicts an example of a computing system in which aspects of the present disclosure can be implemented.

Generally described, aspects of the present disclosure relate to synchronizing lookup data between components of a data intake and query system. The data intake and query system may include one or more search systems to perform ingestion, processing, and searching of data, such as a stream data processing system or a batch search system. A batch search system of the data intake and query system may search within existing data sets including indexed data. A stream data processing system of the data intake and query system may obtain data from an input data stream (also referred to as a "source" stream), manipulate the data according to one or more manipulations (e.g., filtering the data, transforming the data, routing the data, or the like), and write the data to an output data stream (also referred to as a "sink" stream). To facilitate ingestion, processing, and searching of data, the data intake and query system may include data stores with lookup tables corresponding to existing data sets.

A lookup table can include a set of key-value pairs. A data item undergoing processing by a data processing system may include only part of a key-value pair. For example, the data item may include only a key or only a value of a key-value pair. The data processing system may conduct a lookup operation with a lookup table including a set of key-value pairs. The lookup operation may use either the key or the value in a data item to retrieve the other half of the pair (e.g., key for value, value or values for key, etc.) from the lookup table. The data processing system may then enrich the data item by modifying the data item to include the retrieved key or value. Enrichment of the data item may facilitate further processing and/or analysis of the data.

While described as "pairs", either or both keys or values may be represented as tuples of variable length. For example, the key "(a, b)" may be matched with a value "(1,2,3)".

With reference to an illustrative example, the lookup table may include error codes and associated human readable error descriptors. Data items being processed by the data processing system may include error codes. In one example, a data item may include an error code of "1234." In the lookup table, the error code of "1234" may correspond to an error descriptor of "failed login." The data processing system may use a lookup operation to receive the error descriptor and modify the data item to include both the error code of "1234" and the error descriptor of "failed login." Enrichment of the data item to include the error descriptor may facilitate analysis by a human operator. With the error descriptor included, the human operator may be better able to understand what has occurred and assess causes of the error and/or generate solutions to resolve the error.

Keys are not necessarily unique in the lookup table. In the case of multiple matches, the corresponding values may be aggregated into a single value and written into the data item. With reference to another illustrative example, the lookup table may include a key representing userids and corresponding values of employee names and employee departments. Data items being processed by the data processing system may include userid and employee name. For example, a data item may include a userid of "1234" and an employee name of "Jane Doe." For the userid of "1234" the lookup table may additionally include a department of "IT." The stream data processing system may conduct a lookup operation to pull the department corresponding to the userid of "1234" from the lookup table. The data processing system may subsequently modify the data item to include the department of "IT" in addition to the userid of "1234," and employee name of "Jane Doe." In some examples, the data item may include a userid of "1234," employee name of "Jane Doe," and a department of "Engineering." A user may configure a lookup operation to replace an existing department in the data item with the department corresponding to the userid in the lookup table. Illustratively, the stream data processing system may conduct a lookup operation to pull the department of "IT" corresponding to the userid of "1234" from the lookup table. The stream data processing system may modify the data item to replace the department of "Engineering" with the department of "IT."

Keys may be composites of multiple elements, and values may also be composite of multiple elements. A key may be: userid of "1234" AND employee name of "Jane Doe." A corresponding value may be: department of "IT" AND position of "manager." If a data item includes a userid of "1234" but not an employee name of "Jane Doe," the stream data processing system may not modify the data item to include the corresponding department and position. However, if the data item includes a userid of "1234" and an employee name of "Jan Doe," the stream data processing system may modify the data item to include department of "IT" AND position of "manager."

As discussed, lookup operations may facilitate further processing and analysis of data by enriching the data with additional values. However, a drawback of the use of lookup operations in stream data processing is the addition of latency. In stream data processing, quick and precise analysis may be required to ensure that relevant information is captured.

Turning to lookup operations conducted by a stream data processing system, stream data processing system may receive an input stream from one or more streaming data sources. To ingest and process data, the stream data processing system may implement multiple sets of processing instructions, each associated with intaking a particular set of data (e.g., from one or more specified data sources), implementing one or more manipulations (e.g., including filtering, modifying, routing, or otherwise manipulating the data), and outputting the data (e.g., to one or more specified destinations). Each instruction set may be in some cases be referred to as a "pipeline." For example, each instruction set may be logically viewed as a pipeline through which data moves and is manipulated prior to being output.

In stream data processing, quick and precise analysis may be required to complete user-specified tasks. Addition of latency may adversely affect users of the stream data processing system by delaying completion of the specified task or tasks. While a stream data processing system may use lookup tables to enrich data and thereby facilitate data processing and analysis, some configurations of these systems may introduce unnecessary latency into the system. For example, in some existing systems, the stream data processing system may make use of a lookup table at a remote data store, such as a data store within a batch data processing system. For example, a data intake and query system as described above may include both a stream data processing and batch search system. Both the batch search system and the stream data processing system may benefit from the use of lookup operations to enrich data. There may be a large amount of latency added by communications between the stream data processing system and batch data processing system in accessing the lookup table.

One way to do this is to keep a single lookup table, and have each system query the single table for each lookup operation. However, in some examples, the batch search system and stream data processing system operate at different locations. The stream data processing system may be located on a customer's premises and the batch search system may be remote from the customer's premises. The batch search system may include the single lookup table. So, implementation of lookup operations by the stream data processing system requires a query to the single lookup table for each data item, introducing significant latency into the pipeline. As discussed, the addition of latency is especially problematic for stream data processing.

Aspects of the present disclosure address these problems by providing for a mirrored lookup table local to a stream data processing system, where the mirrored lookup table is synchronized (at least partly) to the lookup table of a batch search system. The stream data processing system's use of the mirrored lookup table significantly reduces latency in implementing lookup operations within a pipeline.

Aspects of the present disclosure further provide for updates to be made to the mirrored lookup table during stream data processing. For example, an input stream may include keys or values not included in the mirrored lookup table. With reference to the illustrative example above, for the key of userid "1234," the input data stream may include a data item with a corresponding job position of "supervisor." The stream data processing system may determine that the job position may not be included in the mirrored lookup table, and add the job position to the lookup table as a value for the key of userid "1234." The newly added data may subsequently be used by the stream data processing system to enrich other data items in the input stream. This may advantageously increase the speed of incorporation of new data into the mirrored lookup table and subsequent use of the data in enriching other data items being processed with respect to existing systems.

In some examples, when the mirrored lookup table is updated, the stream data processing system may also send the changes made to the batch search system. The batch search system may then update its lookup table. This batch search system may subsequently use the lookup table in lookup operations responsive to user queries. This may be an improvement with respect to existing systems in increasing the speed of incorporation of new data into the lookup table and subsequent use of the data in enriching other data items being processed.

As will be appreciated by one of skill in the art in light of the present disclosure, the embodiments disclosed herein improve the ability of computing systems, such data intake and query systems, to provide for lookup operations by a stream data processing systems. Moreover, the presently disclosed embodiments address technical problems inherent within computing systems; specifically, increased latency during stream data processing in use of a lookup table at a batch search system remote from the stream data processing system. These technical problems are addressed by the various technical solutions described herein, including the generation of a mirrored lookup table at the stream data processing system, the mirrored lookup table including the set of key-value pairs included in the lookup table at the batch search system. Thus, the present disclosure represents an improvement in data intake and query systems and computing systems in general.

Various aspects of the disclosure will be described with regard to certain examples and embodiments, which are intended to illustrate but not limit the disclosure. Additionally, any feature used in any embodiment described herein may be used in any combination with any other feature or in any other embodiment, without limitation.

FIG. 1 illustrates an example of a computing system 100 in which aspects of the present disclosure can be implemented. In FIG. 1, system 100 illustratively implements a data intake and query system 110 configured to facilitate ingest, processing, and searching of data stored at the data intake and query system 110. The data intake and query system 110 of FIG. 1 may represent a simplified example of a general data intake and query system, such as the data intake and query systems described below in FIGS. 7-11. Accordingly, it should be understood that embodiments described with reference to FIG. 1 may additionally or alternatively be implemented on the data intake and query systems described below. For example, the embodiments described with reference to FIG. 1 may additionally or alternatively be implemented on the data intake and query system of FIG. 7.

In FIG. 1, the data intake and query system 110 illustratively operates to collect, index, and enable searching of machine-generated data, such as for purposes of data analytics. The data intake and query system 110 further operates to enable data processing against streams of data, independent of or prior to collection, indexing and searching of that data. For example, the data intake and query system 110 can provide a stream data processing system 112 configured to conduct stream data processing on a data stream provided by a data source 102 and to output a resulting stream to a data storage system 114, where that stream can be stored as a data set queryable by a batch search system 118. The data intake and query system 118 can further provide a user interface system 116 enabling interaction with the stream data processing system 112, data storage system 114, and batch search system 118. For example, a client may utilize a computing device 104 with a network access application 106 (e.g., a web browser) to interface with the data intake and query system 110 through the user interface system 116 to configure data stream processing on the stream data processing system 112, to access data in the data storage system 114, to conduct batch searches using the batch search system 118, or the like.

Each data source 102 illustratively corresponds to a computing device that generates machine data, such as logs, metrics, or the like. For example, such machine data may be generated during operation of the data source 102 for other purposes (e.g., to implement other functionality of the computing system 100).

The stream data processing system 112 illustratively corresponds to one or more computing devices that obtain data from the data sources 102, manipulate the data according to one or more defined sets of data stream processing instructions, and output the data to a destination, such as the data storage system 114. Because data from data sources 102 in FIG. 1 is unbounded—that is, it has no pre-defined size or termination point—the data can be considered a data stream. Similarly, data output by the stream data processing system 112 can be considered a data stream. Accordingly, the manipulations of the stream data processing system 112 are discussed here as stream data processing.

The stream data processing system 112 may manipulate data in accordance with one or more sets of processing instructions, where each instruction set may be referred to as a "pipeline." For example, each instruction set may be logically viewed as a pipeline through which data moves and is manipulated prior to being output. When implemented by the stream data processing system 112, each pipeline may intake a particular set of data (e.g., from one or more specified data sources 102), implement one or more manipulations (e.g., including filtering, modifying, routing, or otherwise manipulating the data), and output the data (e.g., to one or more specified destinations).

One skilled in the art will recognize that data streams differ from defined or pre-existing data sets (referred to herein as "data sets" for brevity). For example, data streams unlike data sets typically have no fixed size or termination, but can continue (potentially indefinitely) as data is produced. Different terminology may sometimes be used to describe data streams and data sets. For example, data streams are sometimes described as "data in motion," whereas data sets are sometimes described as "data at rest." As another example, data streams may also be described as "unbounded," while data sets may be described as "bounded." Processing for data sets and data streams can differ. For example, while batch processing of a data set may apply statistical techniques (such as averages, medians, distributions, etc.) to the fixed set, stream data processing may apply such techniques to windows within the stream. Batch processing of data sets may be associated with more latency between data generation and processing than stream processing. For example, batch processing may occur periodically (e.g., every x minutes, hours, etc.), processing a past portion of data created by a data source, with each result being delayed by up to the periodicity. Stream processing may occur continuously, enabling rapid results to be produced. Batch processing of a data set can be preferably for some tasks, such as historical analysis of existing data, while stream data processing can be preferably for other tasks, such as continuous monitoring.

The stream data processing system 112 can output data streams to a variety of destinations. For example, where the batch search system 118 provides for indexing of data, the stream data processing system 112 may output a data stream to the batch search system 118 for indexing as a data set. As another example, the user interface system 116 may enable real-time review of data processing by the stream data processing system 112, and as such the stream data processing system 112 may output a data stream to the user interface system 116 for display on a computing device 104. As yet another example, the stream data processing system 112 may output a data stream to the data storage system 114 for storage. As a further example, stream data processing system 112 and could stream to an arbitrary file, object, or database storage system.

The data storage system 114 illustratively corresponds to a network-accessible storage system, a variety of which may be used. Illustratively, the data storage system 114 stores data obtained from the stream data processing system 112. For example, the data storage system 114 may bucketize data obtained from the stream data processing system 112 to create data sets accessible by the batch search system 118, such as by storing each n period of a data stream as a distinct bucket of data. While FIG. 1 depicts the data storage system 114 in communication with the stream data processing system 112 (e.g., via a network on the data intake and query system 110), the data storage system 114 may additionally or alternatively obtain data from data sources 102 without use of the stream data processing system 112.

The batch search system 118 illustratively corresponds to one or more computing devices that conduct batch searches or other batch processing against existing data sets. For example, the batch search system 118 may include an indexing and search system as described below (e.g., the indexing system 720 and search system 760 of FIG. 7). The batch search system 118 may be configured to accept batch operations, such as queries, from a computing device 104 (e.g., via the user interface system 116) and apply such queries to a data set, which may for example be stored within the data storage system 114. Such queries may retrieve relevant data, manipulate the data according to one or more manipulations (e.g., filtering, routing, or transforming the data), and output results, such as by creating a new data set on the data storage system 114, presenting results to the computing device 104 via the user interface system 116, or the like.

As noted above, the user interface system 116 illustratively represents one or more computing devices providing interfaces for the data intake and query system 110. For example, the user interface system 116 may provide command line interfaces (CLIs), graphical user interfaces (GUIs), application programming interfaces (APIs), or the like that are accessible to computing devices 104 over a network to interact with the data intake and query system 110. In one embodiment, the user interface system 116 includes a web server configured to present web pages (e.g., as hypertext markup language, or "HTML", documents) to a computing device 104, which web pages provide an interface for interaction with the data intake and query system 110.

A computing device 104 can utilize a network accessible application 106 to access an interface provided by the user interface system 116 and thus interact with the data intake and query system 110. For example, the network access application 106 may represent a web browser that accesses web pages provided by the user interface system 116, which web pages enable a user of the computing device 104 to, e.g., browse and retrieve data in the data storage system 114, submit queries to the batch search system 118 and obtain results of such queries, or author data stream processing instruction sets ("pipelines") for deployment on the stream data processing system 112.

In accordance with embodiments of the present disclosure, various elements of the data intake and query system 110, such as the stream data processing system 112 and batch search system 118, are configured to reduce latency in execution of lookup operations by stream data processing system 112. Specifically, elements of the data intake and query system may be configured to mirror the lookup table 120 of the batch search system 118 to form mirrored lookup table 122, where mirrored lookup table 122 is local to the stream data processing system 112. Because mirrored lookup table 122 is local to the stream data processing system 112, a lesser amount of latency may be introduced by lookup operations conducted with mirrored lookup table 122 as compared to a lookup table system with a single lookup table shared between systems. This is because the single lookup table system may require communication (e.g., queries, handshakes, etc.) or have other characteristics that cause high latency in accessing the data.

In a single lookup table setup, data processing systems (e.g., stream data processing system 112, batch search systems 118, etc.) may query the lookup table when conducting each lookup operation in order to enrich data items. With respect to an illustrative example, the data item may include a userid, but not a name. Both the userid and corresponding name may be included in lookup table 120. To enrich the data item, a data processing system may retrieve the name from the lookup table and modify the lookup table to include both the userid and the name. Latency may be introduced by lookup operations where the lookup table is stored remotely from the system implementing the lookup operations.

As an example of latency introduced by a single lookup table system, lookup table 120 may serve as a single lookup table with respect to the batch search system 118 and stream data processing system 112. Lookup table 120 may be remote from stream data processing system 112. For example, lookup table 120 may be local to batch search system 118, where batch search system 118 may be part of a cloud service. The stream data processing system 112 may be included in an on-premise network remote from the cloud service. Accordingly, to implement lookup operations in accordance with a single lookup table system, the stream data processing system 112 may query the lookup table 120 for each lookup operation included in a pipeline and for each data item processed with the pipeline. This adds significant latency to lookup operation. This is a significant problem in stream data processing at least because some of the data processed by stream data processing system 112 may be transient, and increased latency may result in failure to enrich these transient data items.

Aspects of the present disclosure may reduce latency in lookup operations conducted by the stream data processing system 112 at least by mirroring lookup table 120 to form mirrored lookup table 122, which is local to the stream data processing system 112. The mirrored lookup table 122 may include a replica of the set of key-value pairs included in lookup table 120. The stream data processing system may accordingly use the mirrored lookup table 122 to conduct lookup operations. Because the mirrored lookup table 122 is local to the stream data processing system 112, less latency may be introduced in transmitting queries and receiving response in accordance with lookup operations implemented by the stream data processing system 112.

To form mirrored lookup table 122, the data intake and query system 110 may download the lookup data from the lookup table 120 into a local data store accessible to stream data processing system 112, such as mirrored lookup table 122. The data intake and query system 110 may cause the download of lookup table 120 to the mirrored lookup table 122 at scheduled intervals and/or on the occurrence certain events including, but not limited to, an update to the lookup table 120, creation of a pipeline, or an update to pipeline settings. For example, as will be discussed in more detail in FIGS. 3-5, the data intake and data processing system 110 may provide stream data processing instructions to stream data processing system 112 that cause the stream data processing system 112 to request a download of lookup table 120.

Downloads may also take time and thereby introduce latency. Accordingly, reducing the number of downloads may reduce the latency. To reduce the number of downloads, the data intake and query system 110 may limit downloads based on specified download criteria. A client may utilize a computing device 104 with a network access application 106 (e.g., a web browser) to interface with the data intake and query system 110 through the user interface system 116 to provide download criteria to the data intake and query system 110. Download criteria may include a type of pipeline update, such as adding or removing more than a certain number of transformation or manipulation steps. As another example, download criteria may specify an interval for periodic downloads of lookup data.

The stream data processing system 112 may use the lookup data in mirrored lookup table 122 in enriching streaming data input. For example, the stream data processing system 112 may process a data item with including a userid of "12345." The mirrored lookup table 122 may include a name of "Jane Doe" corresponding to the userid of "12345." The stream data processing system 112 may conduct a lookup operation, as part of a pipeline, to retrieve the name corresponding to the userid of "12345." The stream data processing system 112 may then modify the data item to include the name "Jane Doe" in addition to the userid of "12345," thereby enriching the data item.

The stream data processing system 112 may also determine updates to the lookup data based on the streaming data input, and implement these updates in mirrored lookup table 122. For example, the stream data processing system 112 may encounter additional keys and/or values in a data item, which may not be included in mirrored lookup table 122. In one example, a data item may include a userid of "23456." The userid of "23456" may not be included in the mirrored lookup table 122. The stream data processing system 112 may recognize that the userid of "23456" is not included in the mirrored lookup table 122 through failed lookup operation on the userid of "23456." On recognizing that the userid of "23456" is not included in mirrored lookup table 122, the stream data processing system 112 may then flag that there is additional information in the data item that can be included in mirrored lookup table 122. Additional values for the userid of "23456," such as a name, job position, or department may also be identified in the data item or in subsequent data items and added to the mirrored lookup table 122. This added information may be used to enrich data items subsequently processed by the stream data processing system 112.

FIG. 2 illustrates a data item table 200 including example data items which may be enriched through application of lookup operations by a data processing system (e.g., batch search system 118, stream data processing system 112, etc.).

The stream data processing system 112 may use lookup operations with lookup table 202 to enrich the data items. Lookup table 202 includes a set of key-value pairs, which correspond to keys or values included in the data items.

For example, data item 204 may include a userid of "1916," but be missing a department corresponding to the userid of "1916." The lookup table 202 may include that the department corresponding to the userid of "1916" is "Personnel" and that a name corresponding to the userid of "1916" is "Alex Martin." A data processing system (e.g., batch search system 118, stream data processing system 112, etc.) may apply a lookup operation to retrieve one or both of the department or name corresponding to the userid of "1916" from lookup table 202.

Lookup operations may be provided in a create pipeline request and specify what data should be retrieved from a lookup table, such as lookup table 202, to enrich the data operations. may reference datasets for use in application of the lookup operations. An example lookup operations with respect to lookup table 202 is provided below as lookup operations (1)-(3).

| | |
|---|---|
| Lookup userid OUTPUT username, department | (1) |
| lookup userid OUTPUT department | (2) |
| lookup userid | (3) |

Lookup operations may include what values should be retrieved for a given key, such as userid. The lookup operation may specify a subset of the values corresponding to a given key. Lookup operation (2) for example may specify that only a department value should be returned from lookup table 202 for any given userid. Accordingly, a userid of "1916" should return a result of "Personnel." The data processing system may subsequently modify the data item 204 to include the value of "Personnel" in the column corresponding to the value of department.

In some examples, lookup operations may not specify output. For example, lookup operation (3) specifies only an input, such as userid. The result of a lookup operation implementing the lookup function may include all values corresponding to a userid, with the exception of the "userid". With reference to FIG. 2, a userid of "1916" may correspond to a result of (username: "Alex Martin," department: Personnel). The data processing system may subsequently modify the data item 204 to include the value of "Personnel" in the column corresponding to the value of department. The data processing system may also add a column to the data item table 200 representing username values. The data item 204 may then be modified to include the value of "Alex Martin" in the column corresponding to the value of username.

While lookup table 202 is in the form of a tabular data structure including rows and columns, this is not intended to be limiting. Lookup tables, such as the mirrored lookup table 122 discussed herein may include other types of data structures. The data structures may be configured to facilitate lookup operations. For example, mirrored lookup table 122 may store the data in structures corresponding to lookup operations in the pipeline. For example, the mirrored lookup table 122 may store results corresponding each potential input of a lookup operation (e.g., keys of values included in a data item) as a separate bucket. This may facilitate execution of those pipelines by reducing search time within the mirrored lookup table 122 to identify results corresponding to input derived from a data item being processed (e.g., keys of values included in the data item).

Figure 3:
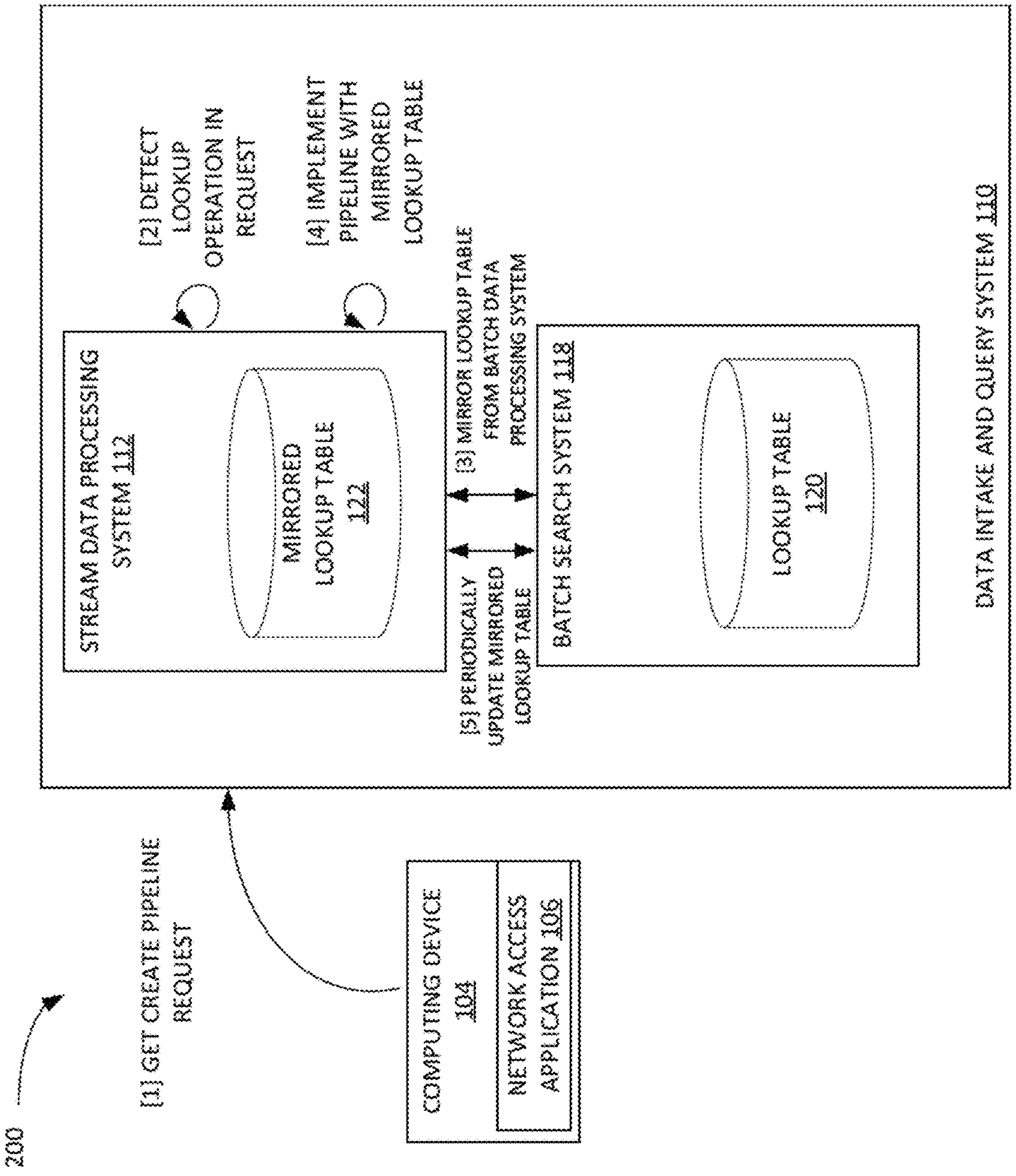
FIG. 3 depicts example interactions for generating and periodically updating a mirrored lookup table.

FIG. 3 depicts illustrative interactions for generating a mirrored copy of lookup table 120 of the batch search system 118 in stream data processing system 112. As discussed above, generation of a mirrored copy of lookup table 120 at the stream data processing system reduces latency by reducing time needed to conduct lookup operations. As discussed in FIG. 1 lookup table 120 and batch search system 118 may be part of a cloud service remote with respect to stream data processing system 112. Mirroring lookup table 120 reduces latency at least because lookup operations with a local lookup table are faster than querying a lookup table at a remote data source.

Turning to the interactions described at FIG. 3, at [1], the data intake and query system 110 gets a create pipeline request from computing device 104. For example, a user may enter the request to create a pipeline into a user interface presented through computing device 104. The user interface may be for the stream data processing system 112 and allow specification and submission of the create pipeline request to the data intake and query system 110. The user interface may be presented to the user through a browser, such as network access application 106.

The create pipeline request may include stream data processing instructions specifying a data source that the client would like the pipeline to process data from and one or more lookup operations. Lookup operations may request that data from the data source be enriched with data from a lookup table of the data intake and query system. The stream data processing instructions may also include, but is not limited to, data partitions and data transformations. As used herein, data transformations may refer to additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

At [2], the stream data processing system 112 detects a lookup operation in the create pipeline request. In some embodiments, the stream data processing system 112 may analyze stream data processing instructions within the create pipeline request, and identify a request for a lookup operation within this request. In some examples, the stream data processing system may use one or more application programming interfaces (APIs) to identify lookup operations within create pipeline requests. Alternately, the create pipeline request may include indicators identifying lookup operations specified within the create pipeline request. As one example, the indicators may be included in the stream data processing instructions. If the headers are present, the stream data processing system 112 may detect a lookup operation in the create pipeline request.

At [3], the stream data processing system 112 mirrors lookup table 120 of the batch search system 118. The stream data processing system 112 may mirror lookup table 120 to generate mirrored lookup table 122, which may be local to the stream data processing system 112. As discussed above, generation of the mirrored lookup table 122 local to the stream data processing system 112 may advantageously reduce latency by reducing the time required to conduct lookup operations.

The lookup table 120 may include a set of key-value pairs, and the mirrored lookup table 122 may replicate the set of key-value pairs. The set of key-value pairs in the mirrored lookup table may subsequently be accessed by the stream data processing system 112 during data processing of a streaming data input, as will be discussed in more detail in FIGS. 3-4. Note that, in some examples, only a subset of the key-value pairs may be mirrored. For example, the lookup table 120 may include key-value pairs for more than one user. However, the mirrored lookup table 122 may be used by one user. Accordingly, the mirrored lookup table 122 may replicate the subset of key-value pairs corresponding to that user. This may advantageously decrease latency in replicating the table.

While FIG. 3 depicts interactions between stream data processing system 112 and batch search system 118, there may be one or more intermediaries between the stream data processing system 112 and batch search system 118 involved in generating the mirrored lookup table 122. Potential intermediaries may be discussed in more detail with respect to FIGS. 7-11. For example, a handler may be configured to convert received input from the user interface or from the batch search system 118 into a form which can be used at runtime by the stream data processing system 112. The handler may store a copy of the lookup table 120. For example, once a lookup dataset is created by batch search system 118 and stored in lookup table 120, the handler may copy the lookup table 120. Alternately, the handler may sync its own copy of the lookup table 120 to match an updated version of the lookup table 120. The handler may generate another table, also referred to herein as a dispatch table, in a form understandable to the stream data processing system 112. Alternately, the handler may generate the dispatch table in a form understandable to a second intermediary. The second intermediary may parse lookup operations included in the create pipeline request from [1] for inclusion into the mirrored lookup table 122, as discussed with respect to FIG. 2. Once created, the mirrored lookup table 122 may be a simple database allowing retrieval of key-value pairs. Each key-value pair of the set of key-value pairs replicated from the lookup table 120 may be stored in isolated data structures within the mirrored lookup table to facilitate retrieval, as discussed with respect to FIG. 2.

At [4], the stream data processing system 112 implements the pipeline with mirrored lookup table 122. Based on stream data processing instructions included in the create pipeline request received at [1], the stream data processing system may define a pipeline of sequenced commands that refines or enhances the data at each step along the pipeline until the desired results are attained. One or more of the sequenced commands may include lookup operations determined at [2], with instructions to perform the lookup operations with the mirrored lookup 122. As discussed above this may reduce use of computing resources as compared to querying the lookup table 120 in the batch search system for every time the lookup function is implemented for a data item processed by the pipeline. Use of the mirrored lookup table 122 in stream data processing operations will be discussed in more detail in FIG. 5.

At [5], the stream data processing system 112 communicates with batch search system 118 to periodically update the table to correspond with the lookup table 120. In some examples, the periodicity of the updates may depend on the receipt of update pipeline requests from a user through network access application 106. The mirrored lookup table 122 may be updated on receipt of an update pipeline request from the computing device 104. The table may be updated with interactions [1]-[3], as described above. In some examples, how the table is updated may depend on the significance of the pipeline update specified in the update pipeline request and whether the lookup table 120 has been updated since mirrored lookup table 122 was last mirrored from lookup table 120. For example, if several new lookup operations are added, the mirrored lookup table 122 may be updated by the stream data processing system 112 to include additional buckets, as described with respect to FIG. 2. However, if the lookup table 120 has not been updated since the mirrored lookup table 122 was last mirrored from lookup table 120, data may not be downloaded from lookup table 120 for incorporation or replacement of data included in mirrored lookup table 122.

Additionally or alternatively, the periodicity of the update may be set by an administrator of the data intake and query system 110 to align with updates to the lookup table 120 by the batch search system. For example, batch search system 118 may update lookup table 120 at intervals. The intervals may be specified by an administrator of the data intake and query system 110. Alternately, the intervals may be specified by a user through network access application 106. The updates to the lookup table 120 may be based on newly indexed data generated by the batch search system 118, which may addition, removal, or otherwise modifying of key-value pairs to the set of key-value pairs described at [3]. On update of lookup table 120, the batch search system 118 may provide a copy of lookup table 120 to the stream data processing system 112, as described above with respect to [3]. In some examples, the batch search system 118 may provide a copy of lookup table 120 after an update without receipt of a request from the stream data processing system 112. On receipt of the copy of the lookup table 120, the stream data processing system 112 may update mirrored lookup table 122.

As an alternative to providing a copy of the lookup table 120, the batch search system 118 may provide a hash of lookup table 120 to the stream data processing system 112 the stream data processing system 112 may query the hash to determine that the lookup table 120 has changed previously mirrored version of mirrored lookup table 122. The stream data processing system 112 may then update mirrored lookup table 122.

As another alternative, the batch search system 118 may provide a change notification, where the change notification includes the changes made to the lookup table. The change notification may include update tracking, such that the stream data processing system 112 could obtain all updates since a specified point. The specified point may include, but is not limited to, a past version, a timestamp, the like, or some combination thereof. The stream data processing system 112 may then update the mirrored lookup table 122.

Updating the mirrored lookup table 122 may involve mirroring the entire lookup table 120 to replace the existing mirrored lookup table 122. Alternatively, updating the mirrored lookup table 122 may involve determining which key-value pairs have been added, removed or otherwise modified key-value pairs since mirrored lookup table 122 was last mirrored from lookup table 120. Based on this determination, the mirrored lookup table 122 may be updated reflect the added, removed, or otherwise modified key-value pairs.

Figure 4:
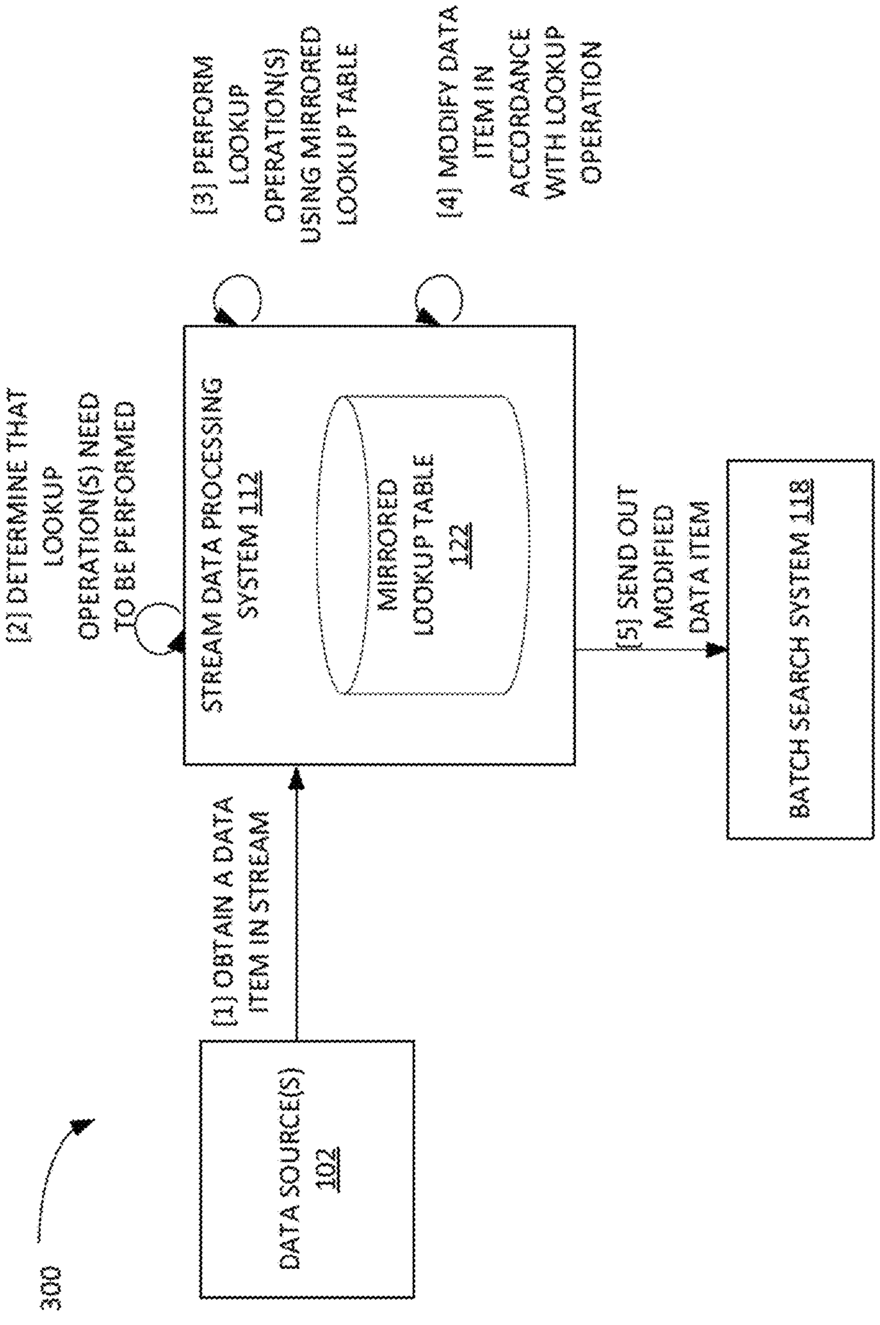
FIG. 4 depicts example interactions for performing lookup operations with a mirrored lookup table.

FIG. 4 illustrates example interactions for use of the mirrored lookup table 122 during processing of streaming data input by stream data processing system 112. Because the mirrored lookup table 122 is local with respect to the stream data processing system 112, use of the mirrored lookup table 122 during processing by the stream data processing system 112 may have less latency that use of a single lookup table at a remote data source.

Turning to the example interactions, at [1], the stream data processing system obtains a data item from streaming data input from data source(s) 102. The data stream may include a data item, where the data item may include one or more fields. The fields may correspond to one or more keys, where the keys may correspond to entries of the mirrored lookup table 122. As discussed with respect to FIG. 2, entries of a lookup table (e.g., lookup table 120, mirrored lookup table 122, etc.) may include key-value pairs where each key corresponds to a value.

In one example, the stream is "pushed" from the data source 102 to the stream data processing system 112. In another example, the stream data processing system 112 "pulls" data from the data source 102 by retrieving the data. While FIG. 4 illustrates transmission of a stream, similar interactions may occur with respect to a batch of data items. Moreover, while FIG. 4 illustrates transmission from source(s) 102 to a stream data processing system 112, the data intake and query system 110 may include other data-obtaining endpoints (not shown in FIG. 4) that obtain data from a data source 102 and provide that data to the stream data processing system 112 or other elements of the data intake and query system 110 (e.g., directly to the data storage system 114 or batch search system 118 without operation of the stream data processing system 112). Obtained data may include any variety of data objects, such as raw machine-generated data from a distributed computing environment that is desired to be stored on the data intake and query system 110.

In the illustrative interactions of FIG. 4, the stream data processing system 112 may apply a data processing pipeline to the data stream, where the pipeline applies one or more manipulations or transformations on each object of the data stream.

At [2], the stream data processing system 112 determines that the data item obtained at [1] satisfies criteria for processing with a pipeline including a lookup operation. As discussed in FIGS. 1 and 3, the stream data processing instructions received during creation or update of a pipeline by the stream data processing system 112 may include one or more lookup operations to be performed against the incoming data. These lookup operations may be incorporated into the streaming data pipeline as lookup operations to be applied to the incoming data stream. As discussed above, each lookup function may specify modifications to the field(s) of data in the streaming data input, such as the data item described at [1] to add values in the mirrored lookup table 122 which correspond to keys included in the fields. Criteria for processing with the pipeline may include, but is not limited to, a data source. For example, if the data item is from a specified input data source for the pipeline, the data item may satisfy criteria for processing with the pipeline. Accordingly, the stream data processing system 112 may determine that a lookup operation needs to be performed.

At [3], the stream data processing system 112 performs the lookup operations using mirrored lookup table 122. For example, with reference to FIG. 2, the stream data processing system 112 may determine that the data item includes a userid of "1916." The stream data processing system 112 may accordingly determine that a lookup operation to return a username and department for a specified userid should be performed. With continued reference to FIG. 2, performing the lookup operation for a data item including a userid of "1916" would return a username of "Alex Martin," and a department of "Personnel."

At [4], the stream data processing system 112 may modify the data item based on the lookup operations performed at [3]. With continued reference to the illustrative example, the stream data processing system 112 may modify the data item including the userid of "1916." to additionally include username of "Alex Martin," and a department of "Personnel." The modified data item may facilitate further processing based on the added values. The modified data item may also facilitate further analysis.

For example, with continued reference to FIG. 2, the data item may relate to an action of "failed password." Additional analysis may be conducted by a human or computer to determine whether the "failed password" action required further action. For example, if there were multiple "failed password" attempts for a userid within a time period, additional analysis may be implemented to determine whether fraudulent attempts are being made to access the account. Having the additional values of username and department added to data items may make it easier for an analyst to understand what is going on or whether there's a larger issue. For example, because of the additional data from the lookup operation an analyst may determine that fraudulent attempts are being made for accounts corresponding to multiple userids in the same department.

At [5], the stream data processing system 112 sends out the modified data item. For example, the stream data processing system 112 may send out the modified data item to a specified destination. In some examples, the stream data processing instructions used to generate or modify the stream data processing pipeline may specify that the output of the pipeline and/or the output of an operation of the pipeline be sent to a specified destination. The specified destination may be the batch search system 118. On receipt of the modified data items, the batch search system may additionally process (e.g., index) and/or store the modified data items.

Figure 5:
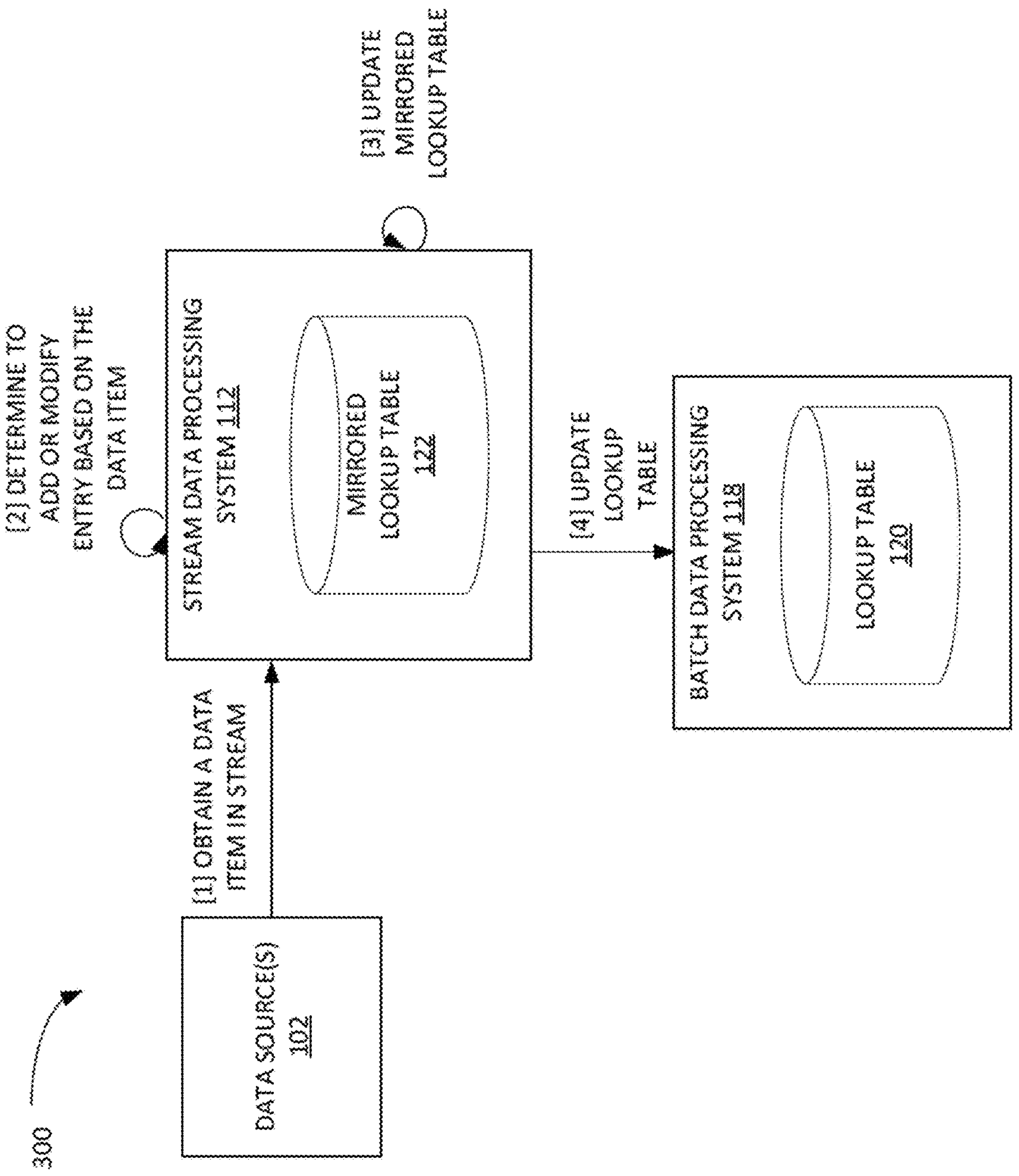
FIG. 5 depicts example interactions for updating the mirrored lookup table based on streaming data input.

FIG. 5 depicts example interactions for updating the mirrored lookup table 122 based on streaming data input. Updating the mirrored lookup table 122 may decrease latency in conducting lookup operations by mitigating a need to wait for data items including additional keys and/or values to be fully processed by a pipeline prior to use of the additional keys and/or values in enriching other data items received in the streaming data input. At [1], the stream data processing system 112 obtains a data item in stream from a data source or data sources 102. As discussed with respect to FIG. 4, the stream is "pushed" from the data source(s) 102 to the stream data processing system 112. Alternately, the stream data processing system 112 may "pull" data from the data source 102 by retrieving the data. The streaming data input may include one or more data items, where each data item includes one or more fields. To review, mirrored lookup table 122 may include a replicated set of key-value pairs corresponding to the set of key-value pairs of lookup table 120. Each field of the streaming data input, including field(s) of the data item, may correspond to one or more keys or key-value pairs of the replicated set of key-value pairs.

At [2], the stream data processing system 112 may determine to add or modify an entry of the mirrored lookup table 122 based on the data item. For example, the data item may include a trigger, such as new field or a new value for an existing field.

With reference to the illustrative example of FIG. 2, the data item may include a new userid of "12345" corresponding to a username of "John Doe." The stream data processing system 112 may determine that the new userid and username should be added to the mirrored lookup table 122.

As another example, with continued reference to the illustrative example of FIG. 2, the data item may include updated values for an existing entry corresponding to a key of a key-value pair of the replicated set of key-value pairs.

The data item may include, for example, an updated department corresponding to a userid. This may reflect that the user has changed departments since the last time the mirror table 122 was updated. In one example, the data item may include a userid of "1815" and a department of "Engineering". As illustrated in example lookup table 202 of FIG. 2, the mirrored lookup table 122 may include that userid of "1815", corresponds to a department of "IT", rather than engineering. Accordingly, the stream data processing system 112 may determine to update the mirrored lookup table 122 to reflect the updated department.

At [3], the stream data processing system 112 may update the mirrored lookup table 122. The update may be based on the determination at [2]. With reference to the illustrative example described at [2], the stream data processing system 112 may determine that the new userid and username should be added to mirrored lookup table 122. The modifications may be made by adding a new key corresponding to the userid of "12345" corresponding to a value of a username of "John Doe."

The stream data processing system 112 may determine to add additional values corresponding to the userid of "12345" based on other data items received in streaming data input. For example, a second data item may include userid of "12345" corresponding to a department of "Personnel". The stream data processing system 112 may accordingly update the mirrored lookup table 122 to include that userid of "12345" corresponds to both a username of "John Doe" and a department of "Personnel."

At [4], the stream data processing system 112 may update the lookup table 120 at the batch search system 118. For example, on update of the mirrored lookup table 122, the stream data processing system 112 may provide a copy of mirrored lookup table 122 to the batch search system 118. On receipt of the copy of the mirrored lookup table 122, the batch search system 118 may update lookup table 120.

As an alternative to providing a copy of the mirrored table 122, the stream data processing system 112 may provide a hash of mirrored lookup table 122 to the batch search system 118. The batch search system 118 may query the hash to determine that the mirrored lookup table 122 has changed since the last time mirrored lookup table 122 was mirrored and/or updated from lookup table 120. The batch search system 118 may then update lookup table 120.

As another alternative, the batch search system 118 may provide a change notification, where the change notification includes the changes made to the lookup table. The change notification may include update tracking, such that the stream data processing system 112 could obtain all updates since a specified point. The specified point may include, but is not limited to, a past version, a timestamp, the like, or some combination thereof. The batch search system 118 may then update the lookup table 120.

Updating the lookup table 120 may involve replacing the entire lookup table 120 to correspond with the current version of mirrored lookup table 122. Alternatively, updating the lookup table 120 may involve determining which key-value pairs have been added, removed or otherwise modified key-value pairs since mirrored lookup table 122 was last mirrored from lookup table 120. Based on this determination, the lookup table 120 may be updated reflect the added, removed, or otherwise modified key-value pairs.

Figure 6:
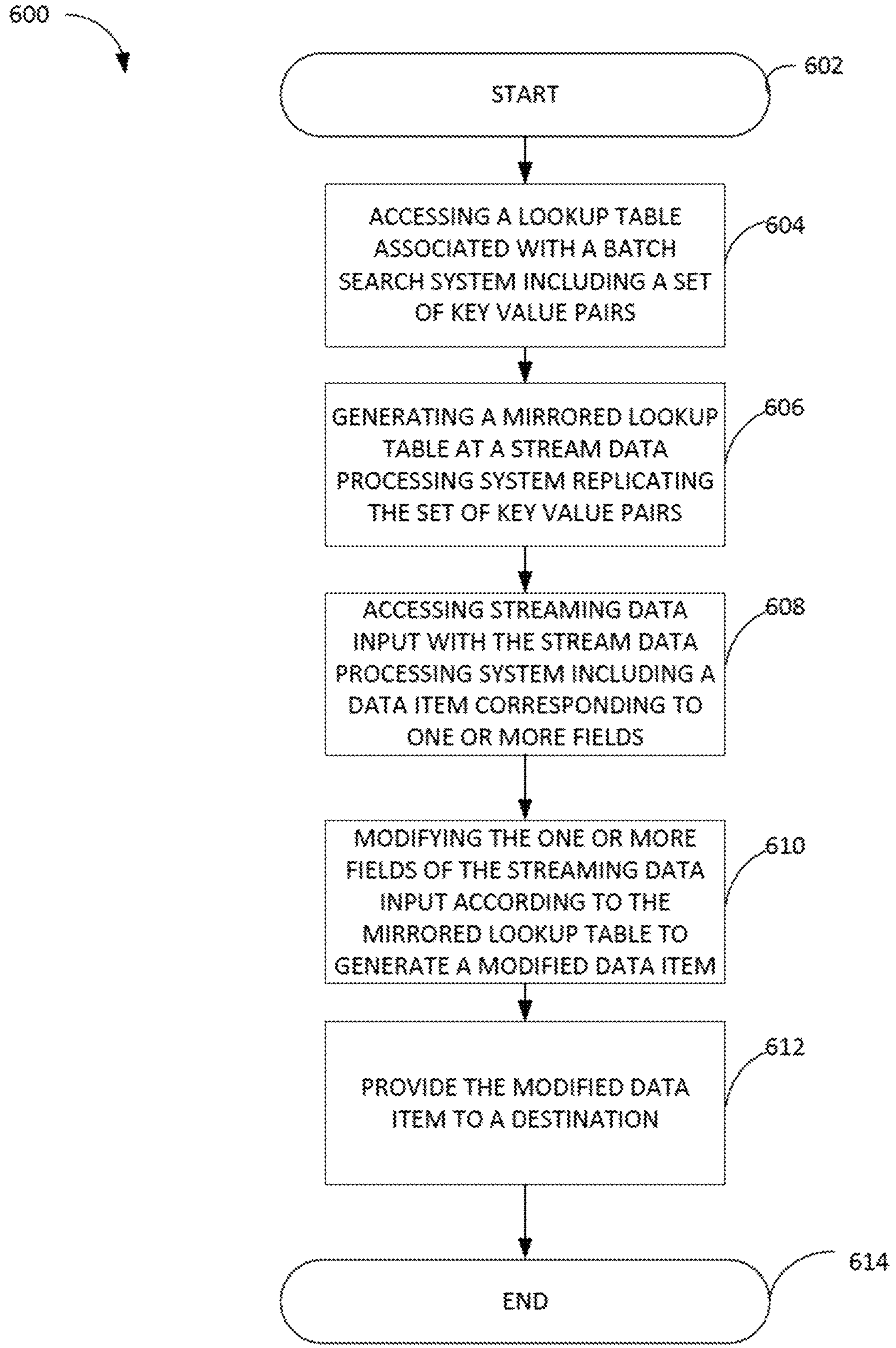
FIG. 6 depicts an example method for generating a mirrored lookup table and performing lookup operations with the mirrored lookup table.

FIG. 6 depicts an example method 600 for generating a mirrored lookup table, such as mirrored lookup table 122 of FIG. 1 and FIGS. 3-5, and performing lookup operations with the mirrored lookup table 122. The method 600 may be implemented by the stream data processing system 112. The method begins at block 602. At block 604, the stream data processing system 112 accesses a lookup table (e.g., lookup table 120 of FIGS. 1, and FIGS. 3-5) associated with a batch search system (e.g., batch search system 118 of FIG. 1, and FIGS. 3-5). The lookup table 120 may include a set of key-value pairs.

The stream data processing system 112 may access the lookup table 120 on receipt of a create pipeline request or an update pipeline request, as discussed with respect to FIG. 3. In some examples, the stream data processing system 112 may access the lookup table 120 after determining that the create pipeline request or update pipeline request includes a lookup operation as described above with respect to FIG. 3. To access the lookup table 120 at batch search system 118, the stream data processing system 112 may request to download a copy of lookup table 120.

At block 606, the stream data processing system 112 generates the mirrored lookup table 122 at least by replicating the set of key-value pairs of the lookup table 120. As discussed at block 604, the stream data processing system 112 may download a copy of the lookup table 120 and store this copy as a mirrored lookup table 122. In some examples, the stream processing system 112 may download a subset of the lookup table 120. Illustratively, the lookup table 120 may include key-value pairs for a plurality of users. The mirrored lookup table 122 may be intend for use by one user. Accordingly, the stream data processing system 112 may download the portion of the lookup table 120 corresponding to that user. Downloading a subset of the lookup table 120 advantageously reduces latency in the download process.

The mirrored lookup table 122 may include a copy of the key-value pairs included in the lookup table 120. In some examples, the mirrored lookup table 122 may include multiple copies of the set of key-value pairs included in lookup table 120.

At block 608, the stream data processing system 112 accesses streaming data input including a data item corresponding to one or more fields. As discussed with respect to FIGS. 4-5, a streaming data source or streaming data sources may push the streaming data input to the stream data processing system 112. Alternately, the stream data processing system 112 may pull streaming data input from the data sources. (e.g., data source(s) 102 of FIGS. 4-5).

The stream data processing system 112 may process the data item in accordance with a pipeline including a lookup operation, as discussed with respect to FIG. 4. Prior to processing the data item with the pipeline, the stream data processing system 112 may determine that the data item meets criteria for processing the data item with the pipeline. The stream data processing system 112 may process the data item with the pipeline. Criteria may include, but is not limited to, a data source for the data item. In other words, if a data item is from a specified data source, the stream data processing system 112 may process the data item with the pipeline.

At block 610, the stream data processing system 112 modifies the one or more fields of the streaming data input according to the mirrored lookup table 122 and the lookup operation of the pipeline to generate a modified data item. For example, with reference to FIG. 2, the data item may include a userid of "1916." The mirrored lookup table 122 may include corresponding values for the userid of "1916," such as a username of "Alex Martin" and a department of "Personnel."

The pipeline used by the stream data processing system 112 to process the data item may include a lookup operation to enrich the data item by modifying the data item to include usernames and departments corresponding to userid. Accordingly, the stream data processing system 112 may modify the data item to additionally include the username of "Alex Martin" and the department of "Personnel."

At block 612, the stream data processing system 112 provides the modified data item to a destination. For example, the stream data processing system 112 may provide the modified data item to a destination, such as the batch search system 118. In one example, the stream data processing system 112 may receive stream data processing instructions specifying a pipeline. The stream data processing instructions may specify that the output of the pipeline be provided to the batch search system 118. As another example, the stream data processing instructions may specify that the output of the pipeline be provided to a client device (e.g., client computing device 104 of FIG. 1 and FIG. 3). The method 600 ends at block 614.

Figure 7:
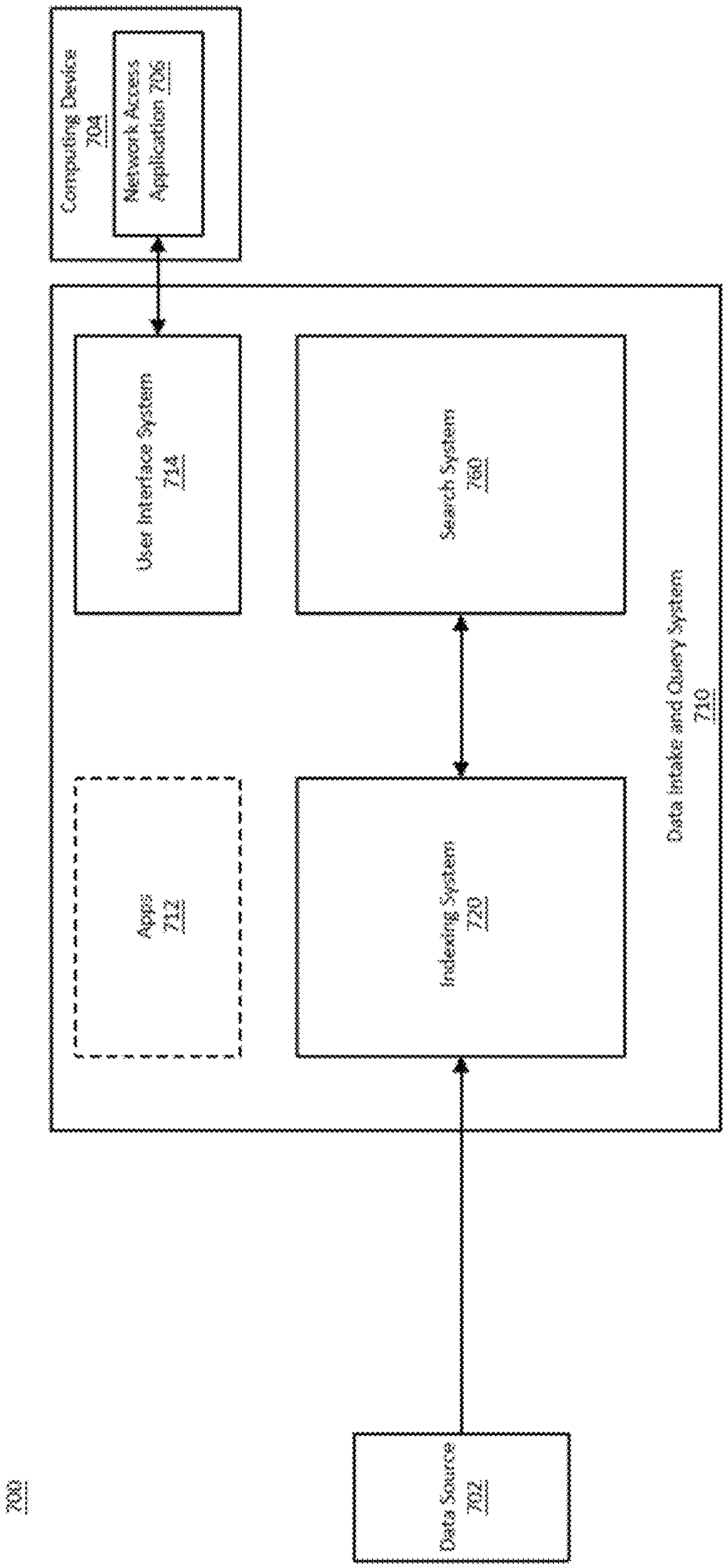
FIG. 7 is a block diagram illustrating an example computing environment that includes a data intake and query system.

FIG. 7 is a block diagram illustrating an example computing environment 700 that includes a data intake and query system 710. The data intake and query system 710 obtains data from a data source 702 in the computing environment 700, and ingests the data using an indexing system 720. A search system 760 of the data intake and query system 710 enables users to navigate the indexed data. Though drawn with separate boxes in FIG. 7, in some implementations, the indexing system 720 and the search system 760 can have overlapping components.

A computing device 704, running a network access application 706, can communicate with the data intake and query system 710 through a user interface system 714 of the data intake and query system 710. Using the computing device 704, a user can perform various operations with respect to the data intake and query system 710, such as administration of the data intake and query system 710, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 710 can further optionally include apps 712 that extend the search, analytics, and/or visualization capabilities of the data intake and query system 710.

The data intake and query system 710 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 710 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 710 can be executed on a single computing device, or execution of the program code can be distributed over multiple computing devices. For example, the program code can include instructions for both indexing and search components (which may be part of the indexing system 720 and/or the search system 760, respectively), which can be executed on a computing device that also provides the data source 702. As another example, the program code can be executed on one computing device, where execution of the program code provides both indexing and search components, while another copy of the program code executes on a second computing device that provides the data source 702. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 702 of the computing environment 700 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 702 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples.

Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 720 obtains machine data from the data source 702 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 720 does not require prior knowledge of the structure of incoming data (e.g., the indexing system 720 does not need to be provided with a schema describing the data). Additionally, the indexing system 720 retains a copy of the data as it was received by the indexing system 720 such that the original data is always available for searching (e.g., no data is discarded, though, in some examples, the indexing system 720 can be configured to do so).

The search system 760 searches the data stored by the indexing system 720. As discussed in greater detail below, the search system 760 enables users associated with the computing environment 700 (and possibly also other users) to navigate the data, generate reports, and visualize search results in "dashboards" output using a graphical interface. Using the facilities of the search system 760, users can obtain insights about the data, such as retrieving events from an index, calculating metrics, searching for specific conditions within a rolling time window, identifying patterns in the data, and predicting future trends, among other examples. To achieve greater efficiency, the search system 760 can apply map-reduce methods to parallelize searching of large volumes of data. Additionally, because the original data is available, the search system 760 can apply a schema to the data at search time. This allows different structures to be applied to the same data, or for the structure to be modified if or when the content of the data changes. Application of a schema at search time may be referred to herein as a late-binding schema technique.

The user interface system 714 provides mechanisms through which users associated with the computing environment 700 (and possibly others) can interact with the data intake and query system 710. These interactions can include configuration, administration, and management of the indexing system 720, initiation and/or scheduling of queries that are to be processed by the search system 760, receipt or reporting of search results, and/or visualization of search results. The user interface system 714 can include, for example, facilities to provide a command line interface or a web-based interface.

Users can access the user interface system 714 using a computing device 704 that communicates with data intake and query system 710, possibly over a network. A "user," in the context of the implementations and examples described herein, is a digital entity that is described by a set of information in a computing environment. The set of information can include, for example, a userid, a username, a password, a user account, a set of authentication credentials, a token, other data, and/or a combination of the preceding. Using the digital entity that is represented by a user, a person can interact with the computing environment 700. For example, a person can log in as a particular user and, using the user's digital information, can access the data intake and query system 710. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of userids, management of security credentials, control of which persons are associated with which users, and so on.

The computing device 704 can provide a human-machine interface through which a person can have a digital presence in the computing environment 700 in the form of a user. The computing device 704 is an electronic device having one or more processors and a memory capable of storing instructions for execution by the one or more processors. The computing device 704 can further include input/output (I/O) hardware and a network interface. Applications executed by the computing device 704 can include a network access application 706, such as a web browser, which can use a network interface of the client computing device 704 to communicate, over a network, with the user interface system 714 of the data intake and query system 710. The user interface system 714 can use the network access application 706 to generate user interfaces that enable a user to interact with the data intake and query system 710. A web browser is one example of a network access application. A shell tool can also be used as a network access application. In some examples, the data intake and query system 710 is an application executing on the computing device 704. In such examples, the network access application 706 can access the user interface system 714 without going over a network.

The data intake and query system 710 may optionally include components configured to enrich data in the data intake and query system. For example, the data intake and query system may 710 may include at least one lookup table including a set of key-value pairs Data intake and query system 710 may further be in communication with data processing systems, such as search system 760, where the data processing systems may be part of a cloud service, part of an on-premise network, or the like. Lookup operations may be conducted by data processing systems in order to enrich data with a lookup table including the set of key-value pairs. A mirrored lookup table may be generated at a data processing system that is part of an on-premise network in order to reduce latency in conducting the lookup operations.

Though FIG. 7 illustrates only one data source, in practical implementations, the computing environment 700 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 700, the data intake and query system 710 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 700 can include on-prem and cloud-based computing resources, or only cloud-based resources. For example, an entity may have on-prem computing devices and a private cloud. In this example, the entity operates the data intake and query system 710 and can choose to execute the data intake and query system 710 on an on-prem computing device or in the cloud. In another example, a provider entity operates the data intake and query system 710 in a public cloud and provides the functionality of the data intake and query system 710 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 710. In some implementations, the entity providing the data intake and query system 710 is itself subscribing to the cloud services of a cloud service provider. As an example, a first entity provides computing resources under a public cloud service model, a second entity subscribes to the cloud services of the first provider entity and uses the cloud computing resources to operate the data intake and query system 710, and a third entity can subscribe to the services of the second provider entity in order to use the functionality of the data intake and query system 710. In this example, the data sources are associated with the third entity, users accessing the data intake and query system 710 are associated with the third entity, and the analytics and insights provided by the data intake and query system 710 are for purposes of the third entity's operations.

Figure 8:
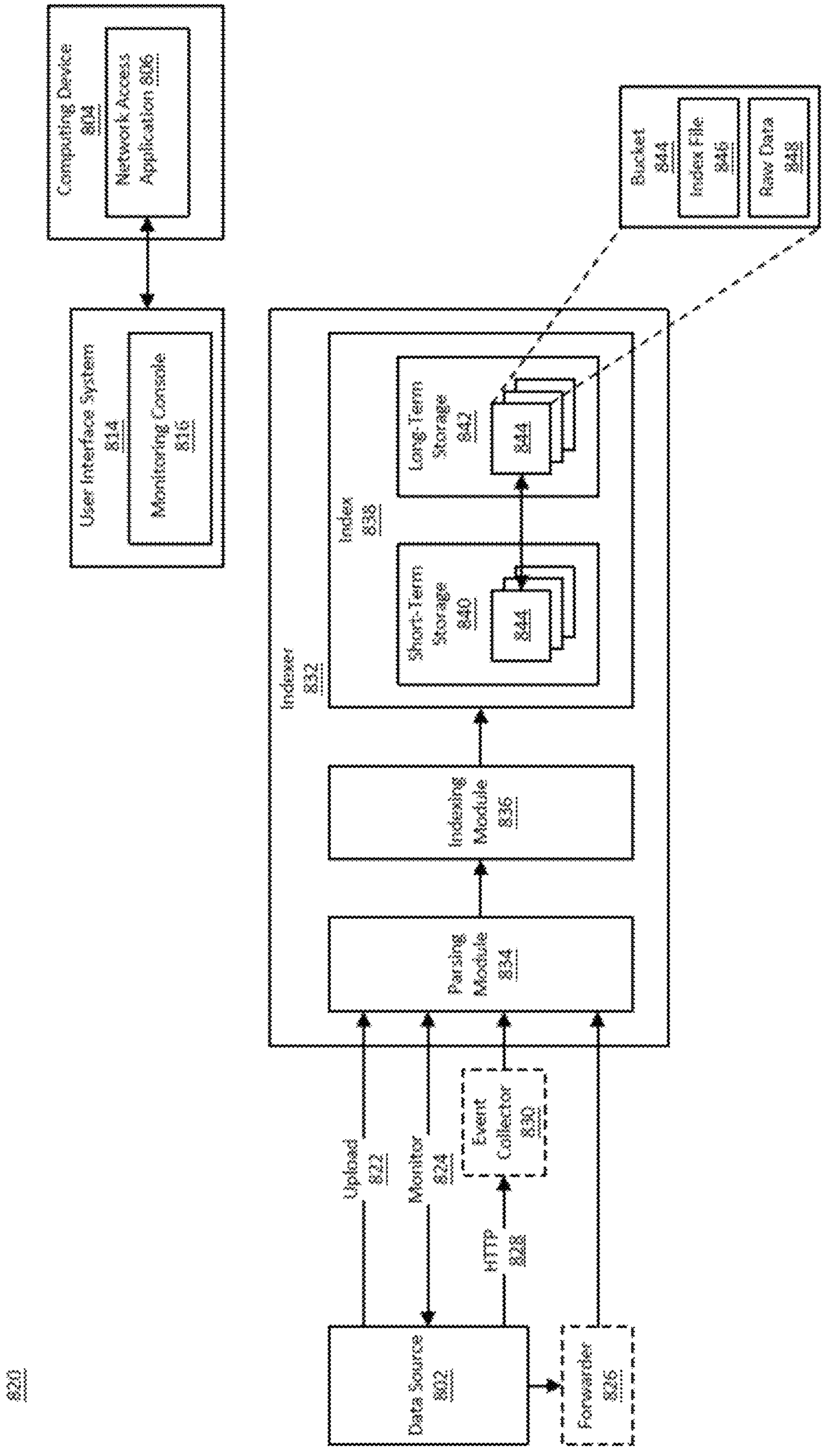
FIG. 8 is a block diagram illustrating in greater detail an example of an indexing system of a data intake and query system.

FIG. 8 is a block diagram illustrating in greater detail an example of an indexing system 820 of a data intake and query system, such as the data intake and query system 710 of FIG. 7. The indexing system 820 of FIG. 8 uses various methods to obtain machine data from a data source 802 and stores the data in an index 838 of an indexer 832. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 820 enables the data intake and query system to obtain the machine data produced by the data source 802 and to store the data for searching and retrieval.

Users can administer the operations of the indexing system 820 using a computing device 804 that can access the indexing system 820 through a user interface system 814 of the data intake and query system. For example, the computing device 804 can be executing a network access application 806, such as a web browser or a terminal, through which a user can access a monitoring console 816 provided by the user interface system 814. The monitoring console 816 can enable operations such as: identifying the data source 802 for data ingestion; configuring the indexer 832 to index the data from the data source 802; configuring a data ingestion method; configuring, deploying, and managing clusters of indexers; and viewing the topology and performance of a deployment of the data intake and query system, among other operations. The operations performed by the indexing system 820 may be referred to as "index time" operations, which are distinct from "search time" operations that are discussed further below.

The indexer 832, which may be referred to herein as a data indexing component, coordinates and performs most of the index time operations. The indexer 832 can be implemented using program code that can be executed on a computing device. The program code for the indexer 832 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 832. In some implementations, the indexer 832 executes on the computing device 804 through which a user can access the indexing system 820. In some implementations, the indexer 832 executes on a different computing device than the illustrated computing device 804.

The indexer 832 may be executing on the computing device that also provides the data source 802 or may be executing on a different computing device. In implementations wherein the indexer 832 is on the same computing device as the data source 802, the data produced by the data source 802 may be referred to as "local data." In other implementations the data source 802 is a component of a first computing device and the indexer 832 executes on a second computing device that is different from the first computing device. In these implementations, the data produced by the data source 802 may be referred to as "remote data." In some implementations, the first computing device is "on-prem" and in some implementations the first computing device is "in the cloud." In some implementations, the indexer 832 executes on a computing device in the cloud and the operations of the indexer 832 are provided as a service to entities that subscribe to the services provided by the data intake and query system.

For a given data produced by the data source 802, the indexing system 820 can be configured to use one of several methods to ingest the data into the indexer 832. These methods include upload 822, monitor 824, using a forwarder 826, or using HyperText Transfer Protocol (HTTP 828) and an event collector 830. These and other methods for data ingestion may be referred to as "getting data in" (GDI) methods.

Using the upload 822 method, a user can specify a file for uploading into the indexer 832. For example, the monitoring console 816 can include commands or an interface through which the user can specify where the file is located (e.g., on which computing device and/or in which directory of a file system) and the name of the file. The file may be located at the data source 802 or may be on the computing device where the indexer 832 is executing. Once uploading is initiated, the indexer 832 processes the file, as discussed further below. Uploading is a manual process and occurs when instigated by a user. For automated data ingestion, the other ingestion methods are used.

The monitor 824 method enables the indexing system 820 to monitor the data source 802 and continuously or periodically obtain data produced by the data source 802 for ingestion by the indexer 832. For example, using the monitoring console 816, a user can specify a file or directory for monitoring. In this example, the indexing system 820 can execute a monitoring process that detects whenever the file or directory is modified and causes the file or directory contents to be sent to the indexer 832. As another example, a user can specify a network port for monitoring. In this example, a monitoring process can capture data received at or transmitting from the network port and cause the data to be sent to the indexer 832. In various examples, monitoring can also be configured for data sources such as operating system event logs, performance data generated by an operating system, operating system registries, operating system directory services, and other data sources.

Monitoring is available when the data source 802 is local to the indexer 832 (e.g., the data source 802 is on the computing device where the indexer 832 is executing). Other data ingestion methods, including forwarding and the event collector 830, can be used for either local or remote data sources.

A forwarder 826, which may be referred to herein as a data forwarding component, is a software process that sends data from the data source 802 to the indexer 832. The forwarder 826 can be implemented using program code that can be executed on the computer device that provides the data source 802. A user launches the program code for the forwarder 826 on the computing device that provides the data source 802. The user can further configure the forwarder 826, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 826 can provide various capabilities. For example, the forwarder 826 can send the data unprocessed or can perform minimal processing on the data before sending the data to the indexer 832. Minimal processing can include, for example, adding metadata tags to the data to identify a source, source type, and/or host, among other information, dividing the data into blocks, and/or applying a timestamp to the data. In some implementations, the forwarder 826 can break the data into individual events (event generation is discussed further below) and send the events to a receiver. Other operations that the forwarder 826 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 830 provides an alternate method for obtaining data from the data source 802. The event collector 830 enables data and application events to be sent to the indexer 832 using HTTP 828. The event collector 830 can be implemented using program code that can be executing on a computing device. The program code may be a component of the data intake and query system or can be a standalone component that can be executed independently of the data intake and query system and operates in cooperation with the data intake and query system.

To use the event collector 830, a user can, for example using the monitoring console 816 or a similar interface provided by the user interface system 814, enable the event collector 830 and configure an authentication token. In this context, an authentication token is a piece of digital data generated by a computing device, such as a server, which contains information to identify a particular entity, such as a user or a computing device, to the server. The token will contain identification information for the entity (e.g., an alphanumeric string that is unique to each token) and a code that authenticates the entity with the server. The token can be used, for example, by the data source 802 as an alternative method to using a username and password for authentication.

To send data to the event collector 830, the data source 802 is supplied with a token and can then send HTTP 828 requests to the event collector 830. To send HTTP 828 requests, the data source 802 can be configured to use an HTTP client and/or to use logging libraries such as those supplied by Java, JavaScript, and .NET libraries. An HTTP client enables the data source 802 to send data to the event collector 830 by supplying the data, and a Uniform Resource Identifier (URI) for the event collector 830 to the HTTP client. The HTTP client then handles establishing a connection with the event collector 830, transmitting a request containing the data, closing the connection, and receiving an acknowledgment if the event collector 830 sends one. Logging libraries enable HTTP 828 requests to the event collector 830 to be generated directly by the data source. For example, an application can include or link a logging library, and through functionality provided by the logging library manage establishing a connection with the event collector 830, transmitting a request, and receiving an acknowledgement.

An HTTP 828 request to the event collector 830 can contain a token, a channel identifier, event metadata, and/or event data. The token authenticates the request with the event collector 830. The channel identifier, if available in the indexing system 820, enables the event collector 830 to segregate and keep separate data from different data sources. The event metadata can include one or more key-value pairs that describe the data source 802 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 830 extracts events from HTTP 828 requests and sends the events to the indexer 832. The event collector 830 can further be configured to send events to one or more indexers. Extracting the events can include associating any metadata in a request with the event or events included in the request. In these implementations, event generation by the indexer 832 (discussed further below) is bypassed, and the indexer 832 moves the events directly to indexing. In some implementations, the event collector 830 extracts event data from a request and outputs the event data to the indexer 832, and the indexer generates events from the event data. In some implementations, the event collector 830 sends an acknowledgement message to the data source 802 to indicate that the event collector 830 has received a particular request form the data source 802, and/or to indicate to the data source 802 that events in the request have been added to an index.

The indexer 832 ingests incoming data and transforms the data into searchable knowledge in the form of events. In the data intake and query system, an event is a single piece of data that represents activity of the component represented in FIG. 8 by the data source 802. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 832 can include a parsing module 834 and an indexing module 836 for generating and storing the events. The parsing module 834 and indexing module 836 can be modular and pipelined, such that one component can be operating on a first set of data while the second component is simultaneously operating on a second sent of data. Additionally, the indexer 832 may at any time have multiple instances of the parsing module 834 and indexing module 836, with each set of instances configured to simultaneously operate on data from the same data source or from different data sources. The parsing module 834 and indexing module 836 are illustrated in FIG. 8 to facilitate discussion, with the understanding that implementations with other components are possible to achieve the same functionality.

The parsing module 834 determines information about incoming event data, where the information can be used to identify events within the event data. For example, the parsing module 834 can associate a source type with the event data. A source type identifies the data source 802 and describes a possible data structure of event data produced by the data source 802. For example, the source type can indicate which fields to expect in events generated at the data source 802 and the keys for the values in the fields, and possibly other information such as sizes of fields, an order of the fields, a field separator, and so on. The source type of the data source 802 can be specified when the data source 802 is configured as a source of event data. Alternatively, the parsing module 834 can determine the source type from the event data, for example from an event field in the event data or using machine learning techniques applied to the event data.

Other information that the parsing module 834 can determine includes timestamps. In some cases, an event includes a timestamp as a field, and the timestamp indicates a point in time when the action represented by the event occurred or was recorded by the data source 802 as event data. In these cases, the parsing module 834 may be able to determine from the source type associated with the event data that the timestamps can be extracted from the events themselves. In some cases, an event does not include a timestamp and the parsing module 834 determines a timestamp for the event, for example from a name associated with the event data from the data source 802 (e.g., a file name when the event data is in the form of a file) or a time associated with the event data (e.g., a file modification time). As another example, when the parsing module 834 is not able to determine a timestamp from the event data, the parsing module 834 may use the time at which it is indexing the event data. As another example, the parsing module 834 can use a user-configured rule to determine the timestamps to associate with events.

The parsing module 834 can further determine event boundaries. In some cases, a single line (e.g., a sequence of characters ending with a line termination) in event data represents one event while in other cases, a single line represents multiple events. In yet other cases, one event may span multiple lines within the event data. The parsing module 834 may be able to determine event boundaries from the source type associated with the event data, for example from a data structure indicated by the source type. In some implementations, a user can configure rules the parsing module 834 can use to identify event boundaries.

The parsing module 834 can further extract data from events and possibly also perform transformations on the events. For example, the parsing module 834 can extract a set of fields (key-value pairs) for each event, such as a host or hostname, source or source name, and/or source type. The parsing module 834 may extract certain fields by default or based on a user configuration. Alternatively, or additionally, the parsing module 834 may add fields to events, such as a source type or a user-configured field. As another example of a transformation, the parsing module 834 can anonymize fields in events to mask sensitive information, such as social security numbers or account numbers. Anonymizing fields can include changing or replacing values of specific fields. The parsing module 834 can further perform user-configured transformations.

The parsing module 834 outputs the results of processing incoming event data to the indexing module 836, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 832 can be configured to identify searchable segments that are parts of fields, searchable segments that are entire fields, or both. The parsing module 834 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 846, to find event data that matches a search query. In some implementations, segmentation can alternatively be performed by the forwarder 826. Segmentation can also be disabled, in which case the indexer 832 will not build a lexicon for the event data. When segmentation is disabled, the search system searches the event data directly.

Building index data structures generates the index 838. The index 838 is a storage data structure on a storage device (e.g., a disk drive or other physical device for storing digital data). The storage device may be a component of the computing device on which the indexer 832 is operating (referred to herein as local storage) or may be a component of a different computing device (referred to herein as remote storage) that the indexer 838 has access to over a network. The indexer 832 can manage more than one index and can manage indexes of different types. For example, the indexer 832 can manage event indexes, which impose minimal structure on stored data and can accommodate any type of data. As another example, the indexer 832 can manage metrics indexes, which use a highly structured format to handle the higher volume and lower latency demands associated with metrics data.

The indexing module 836 organizes files in the index 838 in directories referred to as buckets. The files in a bucket 844 can include raw data files, index files, and possibly also other metadata files. As used herein, "raw data" means data as when the data was produced by the data source 802, without alteration to the format or content. As noted previously, the parsing module 834 may add fields to event data and/or perform transformations on fields in the event data. Event data that has been altered in this way is referred to herein as enriched data. A raw data file 848 can include enriched data, in addition to or instead of raw data. The raw data file 848 may be compressed to reduce disk usage. An index file 846, which may also be referred to herein as a "time-series index" or tsidx file, contains metadata that the indexer 832 can use to search a corresponding raw data file 848. As noted above, the metadata in the index file 846 includes a lexicon of the event data, which associates each unique keyword in the event data with a reference to the location of event data within the raw data file 848. The keyword data in the index file 846 may also be referred to as an inverted index. In various implementations, the data intake and query system can use index files for other purposes, such as to store data summarizations that can be used to accelerate searches.

A bucket 844 includes event data for a particular range of time. The indexing module 836 arranges buckets in the index 838 according to the age of the buckets, such that buckets for more recent ranges of time are stored in short-term storage 840 and buckets for less recent ranges of time are stored in long-term storage 842. Short-term storage 840 may be faster to access while long-term storage 842 may be slower to access. Buckets may be moves from short-term storage 840 to long-term storage 842 according to a configurable data retention policy, which can indicate at what point in time a bucket is old enough to be moved.

A bucket's location in short-term storage 840 or long-term storage 842 can also be indicated by the bucket's status. As an example, a bucket's status can be "hot," "warm," "cold," "frozen," or "thawed." In this example, hot bucket is one to which the indexer 832 is writing data and the bucket becomes a warm bucket when the indexer 832 stops writing data to it. In this example, both hot and warm buckets reside in short-term storage 840. Continuing this example, when a warm bucket is moved to long-term storage 842, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 820 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 820 through the monitoring console 816 provided by the user interface system 814. Using the monitoring console 816, the user can configure and monitor an index cluster, and see information such as disk usage by an index, volume usage by an indexer, index and volume size over time, data age, statistics for bucket types, and bucket settings, among other information.

Figure 9:
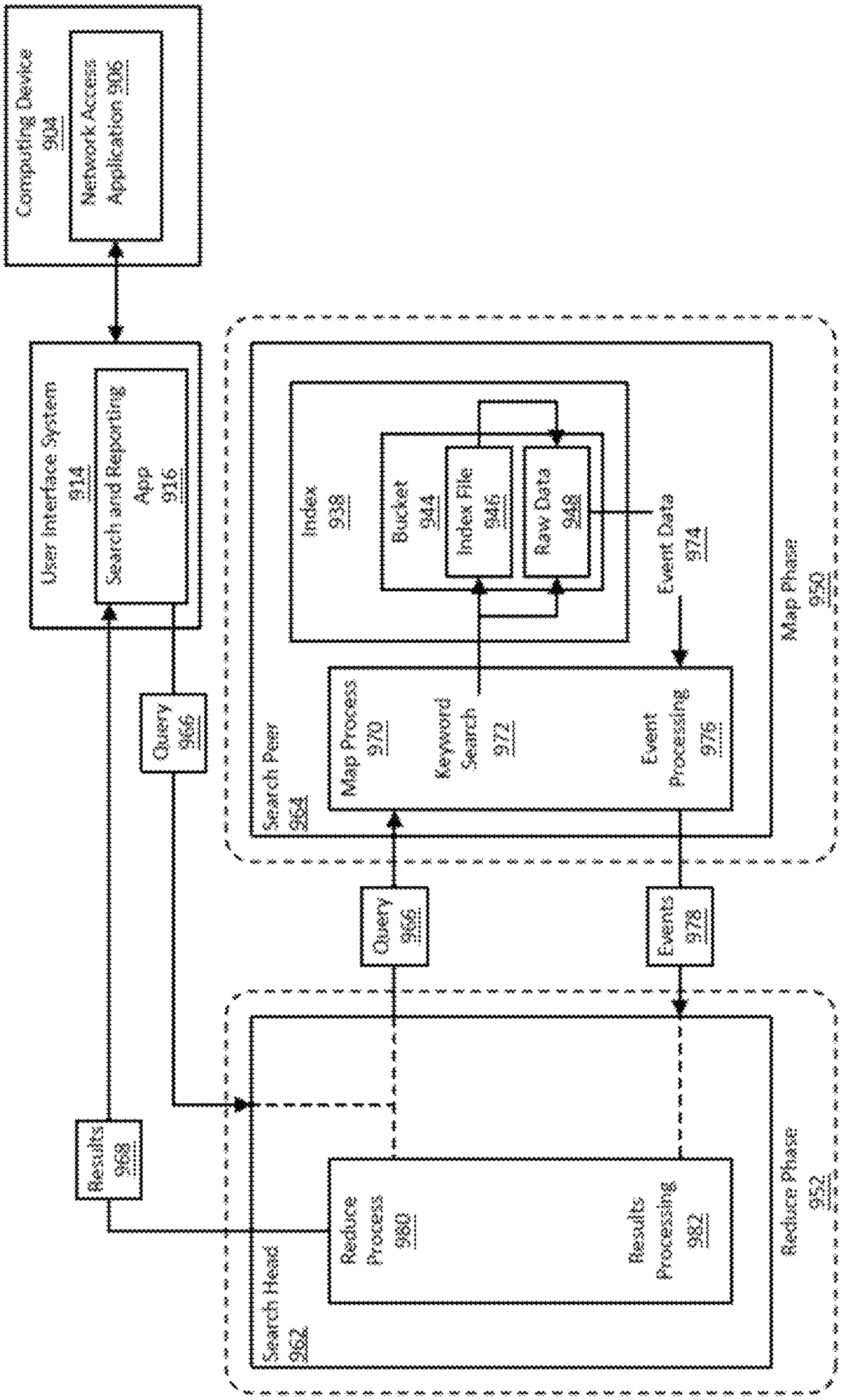
FIG. 9 is a block diagram illustrating in greater detail an example of the search system of a data intake and query system.

FIG. 9 is a block diagram illustrating in greater detail an example of the search system 960 of a data intake and query system, such as the data intake and query system 710 of FIG. 7. The search system 960 of FIG. 9 issues a query 966 to a search head 962, which sends the query 966 to a search peer 964. Using a map process 970, the search peer 964 searches the appropriate index 938 for events identified by the query 966 and sends events 978 so identified back to the search head 962. Using a reduce process 982, the search head 962 processes the events 978 and produces results 968 to respond to the query 966. The results 968 can provide useful insights about the data stored in the index 938. These insights can aid in the administration of information technology systems, in security analysis of information technology systems, and/or in analysis of the development environment provided by information technology systems.

The query 966 that initiates a search is produced by a search and reporting app 916 that is available through the user interface system 914 of the data intake and query system. Using a network access application 906 executing on a computing device 904, a user can input the query 966 into a search field provided by the search and reporting app 916. Alternatively, or additionally, the search and reporting app 916 can include pre-configured queries or stored queries that can be activated by the user. In some cases, the search and reporting app 916 initiates the query 966 when the user enters the query 966. In these cases, the query 966 may be referred to as an "ad-hoc" query. In some cases, the search and reporting app 916 initiates the query 966 based on a schedule. For example, the search and reporting app 916 can be configured to execute the query 966 once per hour, once per day, at a specific time, on a specific date, or at some other time that can be specified by a date, time, and/or frequency. These types of queries may be referred to as scheduled queries.

The query 966 is specified using a search processing language. The search processing language includes commands or search terms that the search peer 964 will use to identify events to return in the search results 968. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 966 to include sequential commands, where a subsequent command may operate on the results of a prior command. As an example, sequential commands may be separated in the query 966 by a vertical line ("|" or "pipe") symbol.

In addition to one or more search commands, the query 966 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 966 occurs in two broad phases: a map phase 950 and a reduce phase 952. The map phase 950 takes place across one or more search peers. In the map phase 950, the search peers locate event data that matches the search terms in the search query 966 and sorts the event data into field-value pairs. When the map phase 950 is complete, the search peers send events that they have found to one or more search heads for the reduce phase 952. During the reduce phase 952, the search heads process the events through commands in the search query 966 and aggregate the events to produce the final search results 968.

A search head, such as the search head 962 illustrated in FIG. 9, is a component of the search system 960 that manages searches. The search head 962, which may also be referred to herein as a search management component, can be implemented using program code that can be executed on a computing device. The program code for the search head 962 can be stored on a non-transitory computer-readable medium and from this medium can be loaded or copied to the memory of a computing device. One or more hardware processors of the computing device can read the program code from the memory and execute the program code in order to implement the operations of the search head 962.

Upon receiving the search query 966, the search head 962 directs the query 966 to one or more search peers, such as the search peer 964 illustrated in FIG. 9. "Search peer" is an alternate name for "indexer" and a search peer may be largely similar to the indexer described previously. The search peer 964 may be referred to as a "peer node" when the search peer 964 is part of an indexer cluster. The search peer 964, which may also be referred to as a search execution component, can be implemented using program code that can be executed on a computing device. In some implementations, one set of program code implements both the search head 962 and the search peer 964 such that the search head 962 and the search peer 964 form one component. In some implementations, the search head 962 is an independent piece of code that performs searching and no indexing functionality. In these implementations, the search head 962 may be referred to as a dedicated search head.

The search head 962 may consider multiple criteria when determining whether to send the query 966 to the particular search peer 964. For example, the search system 960 may be configured to include multiple search peers that each have duplicative copies of at least some of the event data and are implanted using different hardware resources q. In this example, the sending the search query 966 to more than one search peer allows the search system 960 to distribute the search workload across different hardware resources. As another example, search system 960 may include different search peers for different purposes (e.g., one has an index storing a first type of data or from a first data source while a second has an index storing a second type of data or from a second data source). In this example, the search query 966 may specify which indexes to search, and the search head 962 will send the query 966 to the search peers that have those indexes.

To identify events 978 to send back to the search head 962, the search peer 964 performs a map process 970 to obtain event data 974 from the index 938 that is maintained by the search peer 964. During a first phase of the map process 970, the search peer 964 identifies buckets that have events that are described by the time indicator in the search query 966. As noted above, a bucket contains events whose timestamps fall within a particular range of time. For each bucket 944 whose events can be described by the time indicator, during a second phase of the map process 970, the search peer 964 performs a keyword search 972 using search terms specified in the search query #A66. The search terms can be one or more of keywords, phrases, fields, Boolean expressions, and/or comparison expressions that in combination describe events being searched for. When segmentation is enabled at index time, the search peer 964 performs the keyword search 972 on the bucket's index file 946. As noted previously, the index file 946 includes a lexicon of the searchable terms in the events stored in the bucket's raw data 948 file. The keyword search 972 searches the lexicon for searchable terms that correspond to one or more of the search terms in the query 966. As also noted above, the lexicon incudes, for each searchable term, a reference to each location in the raw data 948 file where the searchable term can be found. Thus, when the keyword search identifies a searchable term in the index file 946 that matches a search term in the query 966, the search peer 964 can use the location references to extract from the raw data 948 file the event data 974 for each event that include the searchable term.

In cases where segmentation was disabled at index time, the search peer 964 performs the keyword search 972 directly on the raw data 948 file. To search the raw data 948, the search peer 964 may identify searchable segments in events in a similar manner as when the data was indexed. Thus, depending on how the search peer 964 is configured, the search peer 964 may look at event fields and/or parts of event fields to determine whether an event matches the query 966. Any matching events can be added to the event data #A74 read from the raw data 948 file. The search peer 964 can further be configured to enable segmentation at search time, so that searching of the index 938 causes the search peer 964 to build a lexicon in the index file 946.

The event data 974 obtained from the raw data 948 file includes the full text of each event found by the keyword search 972. During a third phase of the map process 970, the search peer 964 performs event processing 976 on the event data 974, with the steps performed being determined by the configuration of the search peer 964 and/or commands in the search query 966. For example, the search peer 964 can be configured to perform field discovery and field extraction. Field discovery is a process by which the search peer 964 identifies and extracts key-value pairs from the events in the event data 974. The search peer 964 can, for example, be configured to automatically extract the first one hundred fields (or another number of fields) in the event data 974 that can be identified as key-value pairs. As another example, the search peer 964 can extract any fields explicitly mentioned in the search query 966. The search peer 964 can, alternatively or additionally, be configured with particular field extractions to perform.

Other examples of steps that can be performed during event processing 976 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 964 sends processed events 978 to the search head 962, which performs a reduce process 980. The reduce process 980 potentially receives events from multiple search peers and performs various results processing 982 steps on the received events. The results processing 982 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 982 can further include applying commands from the search query 966 to the events. The query 966 can include, for example, commands for evaluating and/or manipulating fields (e.g., to generate new fields from existing fields or parse fields that have more than one value). As another example, the query 966 can include commands for calculating statistics over the events, such as counts of the occurrences of fields, or sums, averages, ranges, and so on, of field values. As another example, the query 966 can include commands for generating statistical values for purposes of generating charts of graphs of the events.

The reduce process 980 outputs the events found by the search query 966, as well as information about the events. The search head 962 transmits the events and the information about the events as search results 968, which are received by the search and reporting app 916. The search and reporting app 916 can generate visual interfaces for viewing the search results 968. The search and reporting app 916 can, for example, output visual interfaces for the network access application 906 running on a computing device 904 to generate.

The visual interfaces can include various visualizations of the search results 968, such as tables, line or area charts, Chloropleth maps, or single values. The search and reporting app 916 can organize the visualizations into a dashboard, where the dashboard includes a panel for each visualization. A dashboard can thus include, for example, a panel listing the raw event data for the events in the search results 968, a panel listing fields extracted at index time and/or found through field discovery along with statistics for those fields, and/or a timeline chart indicating how many events occurred at specific points in time (as indicated by the timestamps associated with each event). In various implementations, the search and reporting app 916 can provide one or more default dashboards. Alternatively, or additionally, the search and reporting app 916 can include functionality that enables a user to configure custom dashboards.

The search and reporting app 916 can also enable further investigation into the events in the search results 968. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 966. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 10:
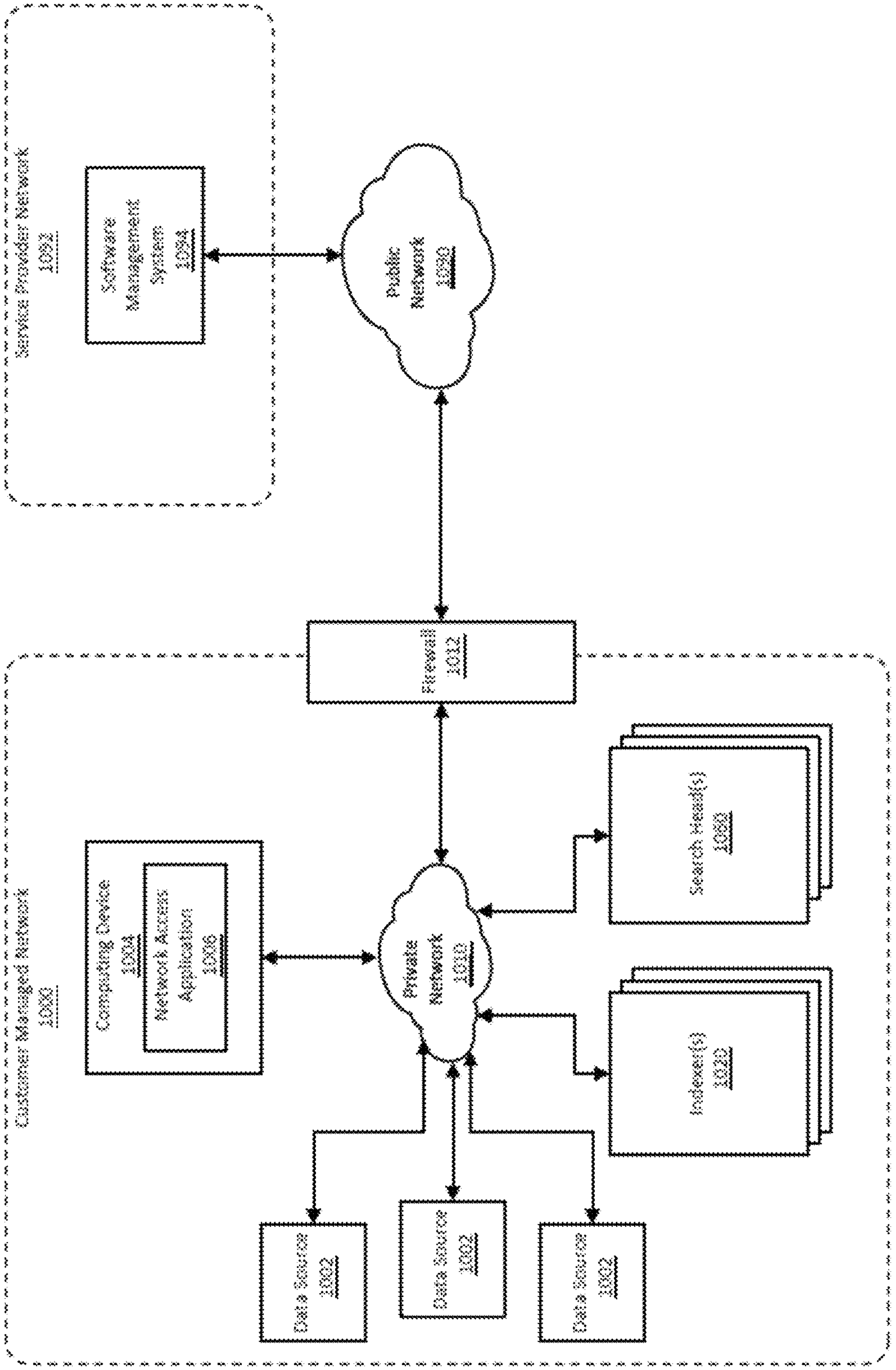
FIG. 10 illustrates an example of a self-managed network that includes a data intake and query system.

FIG. 10 illustrates an example of a self-managed network 1000 that includes a data intake and query system. "Self-managed" in this instance means that the entity that is operating the self-managed network 1000 configures, administers, maintains, and/or operates the data intake and query system using its own compute resources and people. Further, the self-managed network 1000 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1000 is located within the customer's on-prem environment, such as in the entity's data center, the operation and management of the self-managed network 1000, including of the resources in the self-managed network 1000, is under the control of the entity. For example, administrative personnel of the entity have complete access to and control over the configuration, management, and security of the self-managed network 1000 and its resources.

The self-managed network 1000 can execute one or more instances of the data intake and query system. An instance of the data intake and query system may be executed by one or more computing devices that are part of the self-managed network 1000. A data intake and query system instance can comprise an indexing system and a search system, where the indexing system includes one or more indexers 1020 and the search system includes one or more search heads 1060.

As depicted in FIG. 10, the self-managed network 1000 can include one or more data sources 1002. Data received from these data sources may be processed by an instance of the data intake and query system within self-managed network 1000. The data sources 1002 and the data intake and query system instance can be communicatively coupled to each other via a private network 1010.

Users associated with the entity can interact with and avail themselves of the functions performed by a data intake and query system instance using computing devices. As depicted in FIG. 10, a computing device 1004 can execute a network access application 71006 (e.g., a web browser), that can communicate with the data intake and query system instance and with data sources 1002 via the private network 1010. Using the computing device 1004, a user can perform various operations with respect to the data intake and query system, such as management and administration of the data intake and query system, generation of knowledge objects, and other functions. Results generated from processing performed by the data intake and query system instance may be communicated to the computing device 1004 and output to the user via an output system (e.g., a screen) of the computing device 1004.

The self-managed network 1000 can also be connected to other networks that are outside the entity's on-premise environment/network, such as networks outside the entity's data center. Connectivity to these other external networks is controlled and regulated through one or more layers of security provided by the self-managed network 1000. One or more of these security layers can be implemented using firewalls 61012. The firewalls 61012 form a layer of security around the self-managed network 1000 and regulate the transmission of traffic from the self-managed network 1000 to the other networks and from these other networks to the self-managed network 1000.

Networks external to the self-managed network can include various types of networks including public networks 1090, other private networks, and/or cloud networks provided by one or more cloud service providers. An example of a public network 1090 is the Internet. In the example depicted in FIG. 10, the self-managed network 1000 is connected to a service provider network 1092 provided by a cloud service provider via the public network 1090.

In some implementations, resources provided by a cloud service provider may be used to facilitate the configuration and management of resources within the self-managed network 1000. For example, configuration and management of a data intake and query system instance in the self-managed network 1000 may be facilitated by a software management system 1094 operating in the service provider network 1092. There are various ways in which the software management system 1094 can facilitate the configuration and management of a data intake and query system instance within the self-managed network 1000. As one example, the software management system 1094 may facilitate the download of software including software updates for the data intake and query system. In this example, the software management system 1094 may store information indicative of the versions of the various data intake and query system instances present in the self-managed network 1000. When a software patch or upgrade is available for an instance, the software management system 1094 may inform the self-managed network 1000 of the patch or upgrade. This can be done via messages communicated from the software management system 1094 to the self-managed network 1000.

In some implementations, a data intake and query system as described above may further include a stream data processing system and a batch search system. The stream data processing system can illustratively be configured to operate on the basis of data streams, rather than data sets, such as by manipulating the data streams according to one or more data sets of data processing instructions, sometimes referred to as pipelines. The batch search system may be configured to operate on the basis of data sets In some examples, the stream data processing system may be a component of customer managed network 1000, while the batch search system may be a component of service provider network 1092. The service provider network 1092 may further include a lookup table including a set of key-value pairs, where the lookup table is local to the batch search system. The stream data processing system and the batch search system may interact generate a mirrored lookup table including a replica of the set of key-value pairs, as described in FIG. 3. The mirrored lookup table may be local to the stream data processing system, which may reduce latency for the stream data processing system in conducting lookup operations to enrich incoming streams of data. Reduction of latency is important in stream data processing at least to mitigate risks of failure to enrich transient data items included in the incoming data streams.

Figure 11:
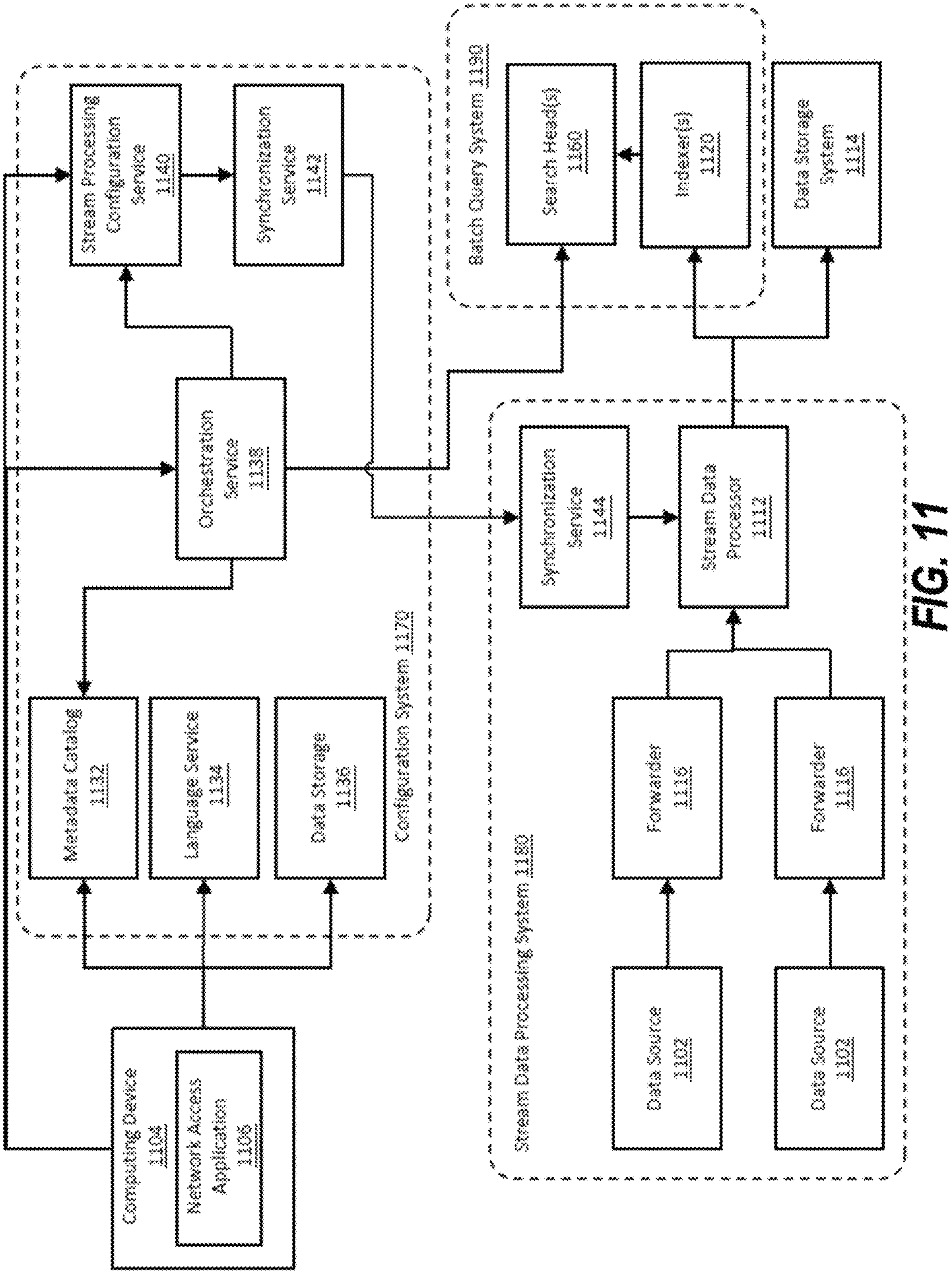
FIG. 11 illustrates an example implementation of a data intake and query system including a stream data processing system.

One example implementation of a data intake and query system including a stream data processing system is shown in FIG. 11. The data intake and query system of FIG. 11 includes a batch query system 1190, including a search head 1160 and an indexer 1120. The search head 1160 and indexer 1120 may operate similarly to the various search heads and indexers described above, such as the search heads 1060 and indexers 1020 of FIG. 10.

As shown in FIG. 11, the search head 1160 and indexer 1120 can (in addition or alternatively to obtaining from data sources 1102) obtain data from a stream data processor 1112 of a stream data processing system 1180. The stream data processor 1112, in turn, can be configured to obtain data from data sources 1102 as an input data stream, manipulate the data according to one or more data stream processing instruction set, and output the resulting data stream to indexers 1120 or other network-accessible storage, such as the data storage system 1114. For example, the stream data processing system 1180 can include one or more forwarders 1116 configured to obtain data from data sources 1102 and forward the data to the stream data processor 1112. In one example, the stream data processor 1112 conducts filtering prior to data moving to indexers 1120. Illustratively, the stream data processor 1112 may identify high value data and route such data to indexers 1120, while routing remaining data to the data storage system 1114. In another example, the stream data processor 1112 conducts other manipulations, such as re-formatting data, compressing data, or the like.

Illustratively, forwarders 1116 may be configured to support a variety of protocols, transmission formats, and data formats that may be used by various data sources 1102, and to forward such data to a stream data processor 1112 in a format acceptable to the process 1112. In some implementations, the stream data processor 1112 may obtain data directly from data sources 1102 and forwarders 1116 may be omitted.

The data intake and query system of FIG. 11 can further include a configuration system 1170 enabling user configuration of the stream data processing system 1180, the batch query system 1190, or both. Illustratively, a user may utilize a network access application 1106, such as a web browser, executing on a computing device 1104 to interact with the configuration system 1170 and appropriately configure the stream data processing system 1180, the batch query system 1190, or both. The configuration system 1170 can include a variety of elements facilitating such configuration. For example, the configuration system 1170 can include data storage 1136 for storage of information used by the network access application 1106, such as web pages renderable on the application 1106 to display interfaces facilitating configuration. The configuration system 1170 can further include a language service 1134 to facilitate creation of batch queries and/or pipelines implementable on the data intake and query system. For example, the language service 1134 may be configured to interpret textual queries as either or both batch queries and pipelines, and generate computer executable instructions executable by the respective stream data processing system 1180 and batch query system 1190 to implement the textual queries. The configuration system 1170 can further include a metadata catalog 1132 storing information regarding the data intake and query system, such as groups (e.g., buckets) of data stored on the batch query system 1190, identifiers for such groups, indexes of such groups, etc. and a configuration of the stream data processing system 1180, such as data stream processing instruction sets deployed to the system 1180 or metadata regarding such pipelines. Illustratively, the network access application 1106 may utilize metadata stored within the metadata catalog 1132 to enable a user of the computing device 1104 to browse data on the data intake and query system, form queries against that data, configure or reconfigure pipelines, and the like.

The configuration system 1170 shown in FIG. 11 further includes an orchestration service 1138 configured to orchestrate operation of the data intake and query system. For example, the orchestration service 1138 can be configured to determine whether to implement a query statement on the stream data processing system 1180, the batch query system 1190, or both (based, e.g., on a time range specified within the query, a source or destination specified in the query, etc.). The orchestration service 1138 can further maintain the metadata catalog 1132 based on results of such queries. In accordance with embodiments of the present disclosure, the orchestration service 1138 may act as a user interface system 116, monitoring for vulnerabilities of applications installed on the configuration system 1170, stream data processing system 1180, or batch query system 1190 and providing indications of data potentially compromised by such vulnerabilities. The orchestration service 1138 may facilitate operation of various functionalities described above, such as by providing for mirroring lookup data between a lookup table accessible to a batch search system and a mirrored lookup table accessible to a stream data processing system.

The configuration system 1170 in FIG. 11 further includes a stream processing configuration service 1140 enabling configuration of the stream data processing system 1180. For example, the stream processing configuration service 1140 may obtain configuration instructions from the computing device 1104 and/or from the orchestration service 1138 and generate a configuration for the stream data processing system 1180 from such instructions. For example, the stream processing configuration service 1140 may generate instructions to implement a data stream processing instruction set based on input from the computing device 1104 and/or the orchestration service 1138. The stream processing configuration service 1140 can illustratively interact with a synchronization service 1142 to provide configuration data to the stream data processing system 1180. For example, the synchronization service 1142 of the configuration system 1170 may interact with a synchronization service 1144 of the stream data processing system 1180 to synchronize a configuration of the stream data process 1112 with that generated at the stream processing configuration service 1140.

Accordingly, by use of the configuration system 1170, a user at a computing device 1104 may configure and utilize either or both the stream data processing system 1180 and batch query system 1190.

In one embodiment, each of the configuration system 1170, stream data processing system 1180, and batch query system 1190 is implemented within a distinct computing environment. For example, the configurations system 1170 may be implemented within a multi-tenant hosted computing environment (which hosted computing environment is sometimes referred to as a "cloud computing environment"). The stream data processing system 1180 may be implemented within a private computing environment, such as a private data center of an end user of the data intake and query system, which private computing environment may be referred to in some cases as an "on premises" environment. The batch query system 1190 may be implemented within a single tenanted hosted computing environment, such as a cloud-hosted environment dedicated to the end user associated with the batch query system 1190. Each of the elements of FIG. 11 may be in communication with one another via one or more networks, including private networks and/or public networks. Lines within FIG. 11 should be understood to depict illustrative logical interactions between elements; however, elements may interact in ways not depicted within FIG. 11.

The single tenanted hosted computing environment implementing the batch query system 1190 may further include a lookup table with a set of key-value pairs. In some examples, the lookup table may be included within the batch query system 1190. The batch query system 1190 may use the lookup table to enrich data processed by the batch search system by conducting lookup operations to identify additional data within the lookup table for inclusion in the data being processed. The stream data processing system 1180 may also conduct lookup operations for streaming data input to enrich incoming data streams. Latency in stream data processing systems may be problematic at least by increasing the risk that transient data within incoming data streams may not be processed. To reduce latency, the batch search system 1190 and stream data processing system 1180 may interact to generate a mirrored lookup table local to the stream data processing system 1180 with a replica of the set of key-value pairs. Other components illustrated in FIG. 11, such as orchestration service 1138 may participate in the interacts to generate the mirrored lookup table. After the mirrored lookup table is generated. the stream data processing system may use the mirrored lookup table in conducting lookup operations. Because the mirrored lookup table is local to the stream data processing system 1180, lookup operations with the mirrored lookup operations have lower latency than if the stream data processing system 1180 conducted lookup operations with the lookup table local to the batch search system 1190.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method implementing at a stream data processing system comprising at least one processor, the computer-implemented method comprising:

accessing a lookup table associated with a batch search system that performs searches, wherein the lookup table includes a set of key-value pairs, each key-value pair associating a specific key with a corresponding value;

generating a mirror of the lookup table at the stream data processing system that manipulates data and writes the data to an output data stream, the mirror replicating the set of key-value pairs of the lookup table from the batch search system that performs the searches to the stream data processing system that manipulates data and writes the data to the output data stream;

accessing a streaming data input with the stream data processing system, wherein the streaming data input includes a data item comprising one or more fields;

modifying the one or more fields of the streaming data input according to the mirror of the lookup table stored at the stream data processing system to result in a modified data item, wherein modifying the one or more fields comprises:

determining that the one or more fields include a key of a key-value pair in the set of key-value pairs, identifying, via a lookup operation performed using the mirror of the lookup table, a value corresponding with the key, and modifying the one or more fields to include the corresponding value for the key; and transmitting the data item to a destination.

2. The computer-implemented method of claim 1, further comprising updating the mirror periodically.

3. The computer-implemented method of claim 2, further comprising generating a user interface based on the updated mirror.

4. The computer-implemented method of claim 2, further comprising updating the mirror on creation of a stream data processing pipeline, wherein the creation of the stream data processing pipeline comprises receiving stream data processing instructions at the stream data processing system and creating a pipeline corresponding to the stream data processing instructions.

5. The computer-implemented method of claim 2, further comprising updating the mirror based on instructions to update a stream data processing pipeline, wherein updates to the mirror are limited based on at least one of a type of update or an amount of updates included in the instructions to update the stream data processing pipeline.

6. The computer-implemented method of claim 2, wherein updating the mirror comprises:

determining that the set of key-value pairs included in the mirror include fewer key-value pairs than the set of key-value pairs included in the lookup table; and adding entries to the set of key-value pairs of the mirror based on the determination.

7. The computer-implemented method of claim 1, further comprising:

receiving a change notification from the batch search system, wherein the change notification includes changes made to the lookup table; and updating the mirror based on the change notification.

8. The computer-implemented method of claim 7, wherein the batch search system provides a hash of the lookup table with the change notification.

9. The computer-implemented method of claim 1, further comprising:

updating the mirror based on the streaming data input, wherein the streaming data input includes additional information corresponding to a particular key-value pair of the replicated set of key-value pairs, wherein updating the mirror comprises adding new or updated entries to the mirror.

10. The computer-implemented method of claim 9, further comprising:

updating the lookup table based on updates to the mirror, wherein updating the lookup table comprises adding the new or updated entries to the lookup table.

11. The computer-implemented method of claim 1, further comprising:

updating the mirror based on updates to the lookup table at intervals, wherein each interval is equivalent to a first time period; and updating the mirror based on the streaming data input, wherein the streaming data input includes additional information corresponding to a particular key-value pair of the replicated set of key-value pairs, wherein updating the mirror comprises adding new or updated entries to the mirror;

updating the lookup table based on updates to the mirror based on streaming data input, wherein the updating the lookup table occurs after a second time period, where the second time period is shorter than the first time period.

12. The computer-implemented method of claim 1, wherein the destination is the batch search system.

13. A system comprising:

one or more processors configured to:

access a lookup table associated with a batch search system that performs searches, wherein the lookup table includes a set of key-value pairs, each key-value pair associating a specific key with a corresponding value;

generate a mirror of the lookup table at the stream data processing system that manipulates data and writes the data to an output data stream, the mirror replicating the set of key-value pairs of the lookup table from the batch search system that performs the searches to the stream data processing system that manipulates data and writes the data to the output data stream;

access a streaming data input with the stream data processing system, wherein the streaming data input includes a data item comprising one or more fields;

modify the one or more fields of the streaming data input according to the mirror of the lookup table stored at the stream data processing system to result in a modified data item, wherein modifying the one or more fields comprises;

determining that the one or more fields include a key of a key-value pair in the set of key-value pairs, identifying, via a lookup operation performed using the mirror of the lookup table, a value corresponding with the key, and modifying the one or more fields to include the corresponding value for the key; and transmit the data item to a destination.

14. The system of claim 13, wherein the one or more processors are further configured to generate a user interface based on the mirror.

15. The system of claim 13, wherein the one or more processors are further configured to update the mirror on creation of a stream data processing pipeline, wherein the creation of the stream data processing pipeline comprises receiving stream data processing instructions at the stream data processing system and creating a pipeline corresponding to the stream data processing instructions.

16. The system of claim 13, wherein the one or more processors are further configured to update the mirror based on instructions to update a stream data processing pipeline, wherein updates to the mirror are limited based on at least one of a type of update or an amount of updates included in the instructions to update the stream data processing pipeline.

17. The system of claim 13, wherein the batch search system is configured to provide a change notification for the lookup table, wherein the change notification includes the changes made to the lookup table, and wherein the stream processing system determines to update the mirror based on the change notification.

18. The system of claim 17, wherein the batch search system provides a hash of the lookup table with the change notification.

19. One or more non-transitory computer-readable media including computer-executable instructions that, when executed by a computing system, cause the computing system to:

access a lookup table associated with a batch search system that performs searches, wherein the lookup table includes a set of key-value pairs, each key-value pair associating a specific key with a corresponding value;

generate a mirror of the lookup table at the stream data processing system that manipulates data and writes the data to an output data stream, the mirror replicating the set of key-value pairs of the lookup table from the batch search system that performs the searches to the stream data processing system that manipulates data and writes the data to the output data stream;

access a streaming data input with the stream data processing system, wherein the streaming data input includes a data item comprising one or more fields;

modify the one or more fields of the streaming data input according to the mirror of the lookup table stored at the stream data processing system to result in a modified data item, wherein modifying the one or more fields comprises:

determining that the one or more fields include a key of a key-value pair in the set of key-value pairs, identifying, via a lookup operation performed using the mirror of the lookup table, a value corresponding with the key, and modifying the one or more fields to include the corresponding value for the key; and transmit the data item to a destination.

20. The non-transitory computer-readable media of claim 19, further including computer-executable instructions that, when executed by a computing system, cause the computing system to:

update the mirror based on the streaming data input, wherein the streaming data input includes additional information corresponding to a particular key-value pair of the set of key-value pairs, wherein updating the mirror comprises adding new or updated entries to the mirror; and updating the lookup table based on updates to the mirror, wherein updating the lookup table comprises adding the new or updated entries to the lookup table.

* * * * *